(12) United States Patent
Kawano et al.

(10) Patent No.: US 6,323,998 B1
(45) Date of Patent: *Nov. 27, 2001

(54) MICROSCOPE APPARATUS

(75) Inventors: Yoshihiro Kawano; Kazuo Kajitani, both of Hachioji; Hiroshi Ishiwata, Yokosuka, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/144,274

(22) Filed: Aug. 31, 1998

Related U.S. Application Data

(63) Continuation of application No. 08/497,400, filed on Jun. 30, 1995, now Pat. No. 5,808,791.

(30) Foreign Application Priority Data

Jul. 1, 1994 (JP) ................................... 6-151122
Nov. 11, 1994 (JP) ................................... 6-277355

(51) Int. Cl.[7] ............................ G03B 13/06; G02B 21/00
(52) U.S. Cl. ........................ 359/434; 359/363; 359/368; 359/380
(58) Field of Search .................................. 359/362–363, 359/368–390, 434–435, 676–677

(56) References Cited

U.S. PATENT DOCUMENTS

| | | | |
|---|---|---|---|
| 4,035,057 | * 7/1977 | Klein | 359/384 |
| 4,204,748 | 5/1980 | Yonekubo | 359/368 |
| 4,299,439 | * 11/1981 | Stromblad | 359/384 |
| 4,576,450 | * 3/1986 | Westphal | 359/384 |
| 4,685,776 | 8/1987 | Inoue et al. | 359/363 |
| 5,138,486 | 8/1992 | Meyer et al. | 359/363 |
| 5,808,791 | * 9/1998 | Kawano et al. | 359/434 |

FOREIGN PATENT DOCUMENTS

| | | | |
|---|---|---|---|
| 46-2940 | 1/1971 | (JP) . | |
| 134214 | 7/1985 | (JP) | 359/380 |
| 60-263918 | 12/1985 | (JP) . | |
| 158310 | 7/1986 | (JP) . | |
| 61-59482 | 12/1986 | (JP) . | |
| 1-154016 | * 6/1989 | (JP) | 359/380 |
| 7-35986 | 2/1995 | (JP) . | |

* cited by examiner

Primary Examiner—Thong Nguyen
(74) Attorney, Agent, or Firm—Pillsbury Winthrop LLP

(57) ABSTRACT

A microscope apparatus includes an objective lens, an imaging lens, a pupil relay lens, and an image relay lens. The primary image of a specimen is formed between the imaging lens and the pupil relay lens, and the image of the pupil of the objective lens is projected between the pupil relay lens and the image relay lens so that a pupil modulator is disposed at the position of the projected pupil image. This arrangement makes it possible to produce pupil modulation, observe various specimens, and set the optimum position of an eyepoint.

21 Claims, 19 Drawing Sheets

SPHERICAL ABERRATION

−0.5    0.5

SPHERICAL ABERRATION

-0.2    0.2

TO IMAGING LENS 52

FROM PUPIL RELAY LENS 39a

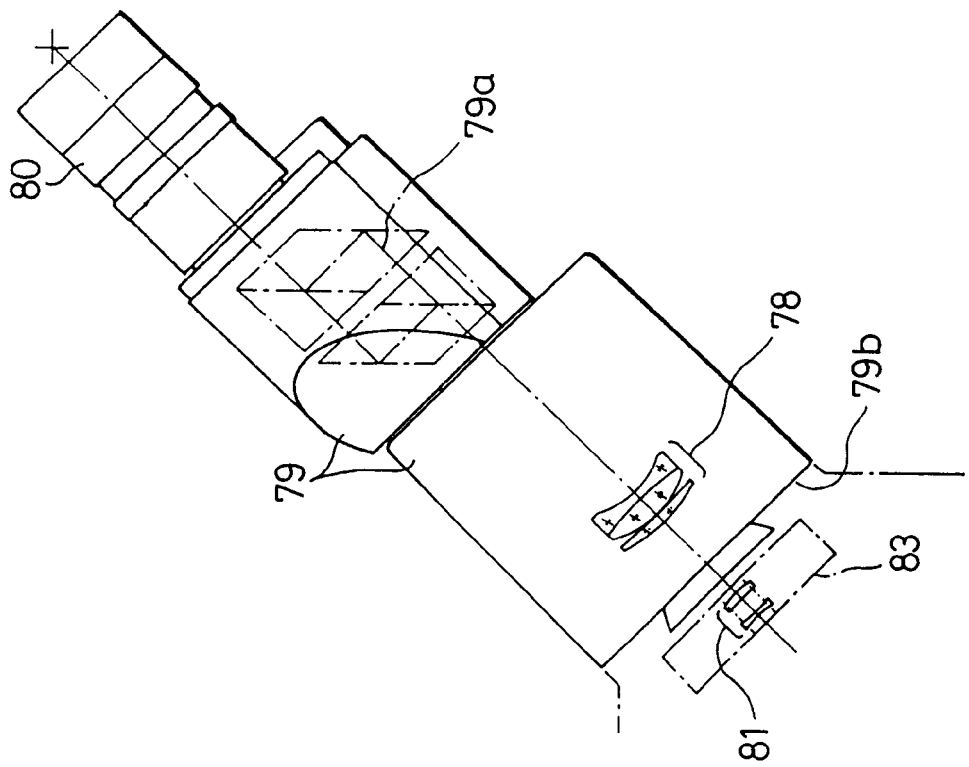
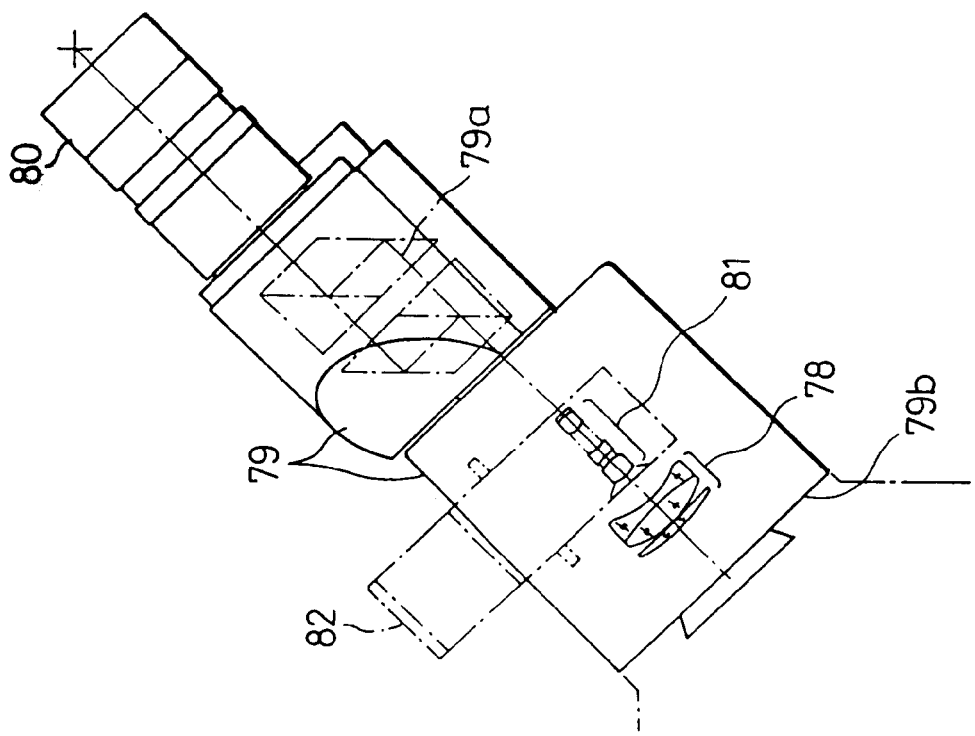

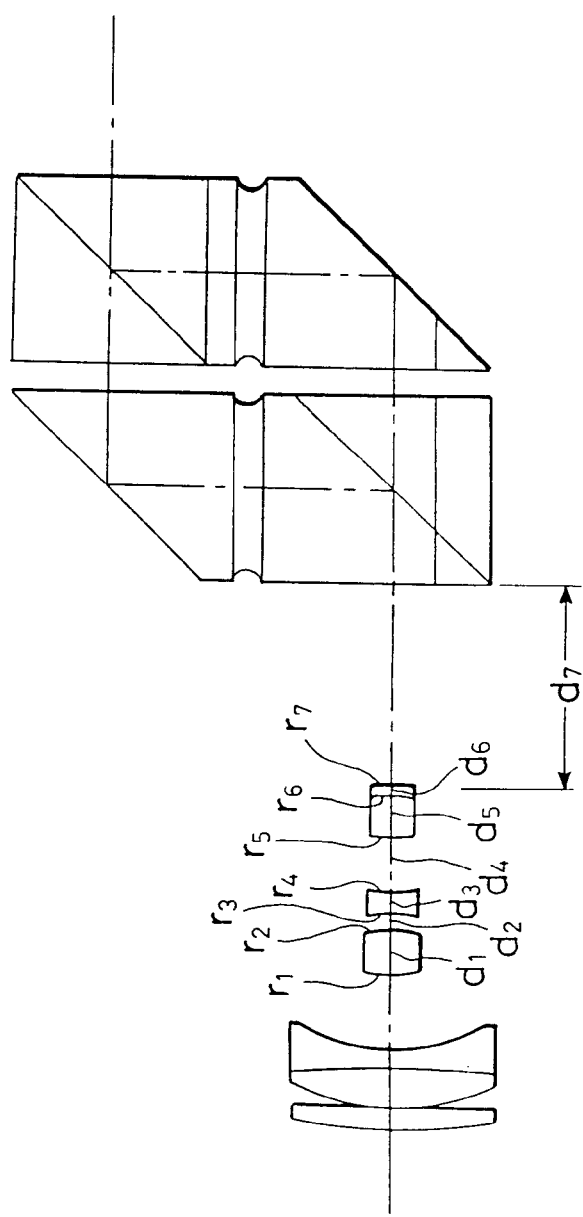
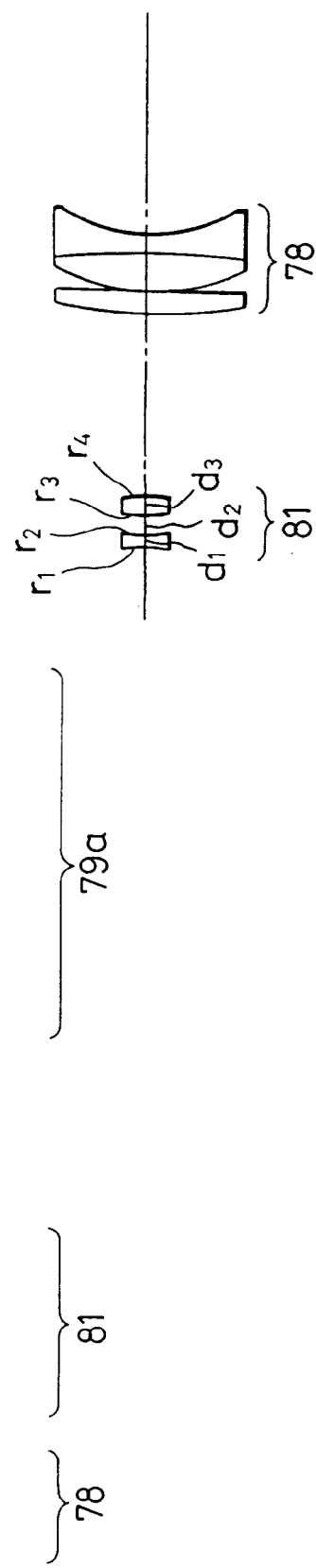
FIG. 19
FIG. 21

MICROSCOPE APPARATUS

This is a continuation of Application No. 08/497,400 filed Jun. 30, 1995, now U.S. Pat. No. 5,808,791.

BACKGROUND OF THE INVENTION

1. Field of the Invention

This invention relates to a microscope apparatus in which a relay optical system is provided and pupil modulation can be produced to observe transparent objects, such as cultured cells.

2. Description of Related Art

Where pupil modulation for phase difference or modulation contrast is produced in a prior art microscope, an annular phase film must be placed in an objective unit. Thus, for example, if a phase-contrast objective lens is used to make a fluorescence observation, fluorescence illumination light and observation light will be absorbed by a modulator and the amounts of light will be decreased. Consequently, the image of a specimen cannot be observed with maximum brightness. Furthermore, if fluorescence and phase-contrast photographs are taken with maximum brightness, a fluorescence objective lens and a phase-contrast objective lens must be provided in replacement of the objective unit in order to prevent attenuation of the amount of light which is attributable to the absorption of light by a phase plate. In this case, it is very difficult to obviate the problem of a position shift in position of a specimen caused by the replacement of the objective unit.

Thus, a pupil projection microscope which provides a pupil modulator in a relay optical system, capable of observing transparent specimens, such as cells, through a bright-field objective lens alone, is proposed by the same applicant as in the present application. This microscope apparatus, as disclosed in Japanese Patent Preliminary Publication No. Sho 60-263918, is designed so that a lens barrel in which a projected pupil image is located can be removed from the body of an inverted microscope, and a phase plate can easily be placed at the position of the projected pupil image.

In addition, as set forth in Japanese Patent Preliminary Publication No. Sho 53-72637 which is also proposed by the same applicant as in the present application, a microscope apparatus is provided in which the pupil of an objective lens is projected in the optical path of a relay lens situated in the body of an inverted microscope and a filter ring element is disposed at the position of this projected pupil. The filter ring element is used by removably mounting an element for phase difference or differential interference.

For a relay optical system for relaying an image without changing magnification, a microscope optical system set forth in Japanese Patent Publication No. Sho 46-2940 is known.

The above-mentioned prior art microscopes, however, have problems which will be described below.

For the pupil projection optical systems used in the conventional inverted microscopes, their specific arrangements are not made clear. Researchers who make actual observations of cells want the use of an objective lens with a low magnification less than 4×. In the conventional microscopes, however, pupil modulation for phase difference has usually been produced by an objective lens with a magnification of 4× or more. It is for this reason that since the objective lens with a low magnification less than 4× has a long focal length, the pupil position is located on the image side of the mounting position of the objective lens, and the pupil modulator which must be situated in the unit of the objective lens is placed out of it to prevent the production of pupil modulation. It is impossible for the conventional inverted microscopes that pupil modulation be produced by the objective lens with a magnification less than 4×.

In the inverted microscope disclosed in Sho 60-263918 mentioned above, the front lens unit of an imaging lens is disposed adjacent to an objective lens, and thereby rays of light emerging from the objective lens are changed into parallel beams. It is therefore considered that this microscope is intended to use the objective lens for finite distance. Thus, where an up-light microscope uses an objective lens for infinite distance, this objective lens cannot be used in the inverted microscope. Moreover, because the front lens unit of the imaging lens is disposed adjacent to the objective lens, a Nomarski prism of the objective lens for infinite distance cannot be used in the up-light microscope. If the objective lens for finite distance must be used, it is required that the imaging lens be constructed with two lens units. This leads to a high lens cost. Also, although the lens barrel is designed to be removable, an image relay lens (an imaging lens for forming an image at the image plane of an eyepiece) is incorporated in the microscope body and the distance between the imaging lens and the image relay lens is made to be invariable, with the result that the position of the eyepoint cannot be arbitrarily changed. As such, persons with various figures cannot observe images in comfortable positions.

The microscope apparatus set forth in Sho 53-72637 is an inverted microscope with an image magnification of 1× and a pupil magnification of 1×. This microscope is designed so that the pupil modulator, such as a phase plate or a prism for differential interference, can be placed at the pupil position in the microscope body. Such a microscope, however, uses the objective lens for finite distance and cannot use the objective lens for infinite distance. Furthermore, the specific arrangement of the inverted microscope optical system is not clear.

For an ordinary optical microscope, as disclosed in Sho 46-2940, incident light on an objective lens becomes telecentric, but imaging rays are not. Hence, where an image formed by such an optical system is relayed, aberrations cannot be completely corrected.

In general, an inverted microscope is liable to produce flare and ghost because it has a large number of optical elements and many reflections of an image. Thus, the inverted microscope has recently come to be required in which observation can be made in such a way that the numbers of lens elements and reflecting members constituting the optical system are made as small as possible and flare and ghost caused by detrimental reflected light are reduced to a minimum.

Furthermore, the users of inverted microscopes have been diversified. In recent years, improvements have been required such that various experiments, for example, of membrane potential measurements, can readily be performed, and various observations with phase-contrast and Nomarski microscopes are easily made. In addition, the users urgently require an inverted microscope in which more than one person can make observations in comfortable positions, namely operability and human engineering are fully considered and more than one person can make observations simultaneously in comfortable positions. For prior art corresponding to this, a microscope disclosed in Japanese Patent Publication No. 7-35986 filed by the same applicant as in the present application is known. However, this prior art article fails to describe the details of an optical system in which several people make observations simultaneously and of an improvement on operation.

The of the inverted microscopes of the prior art are designed to observe a specimen from the lower side. Hence, unlike the up-light microscope capable of observing directly the image of an object, reflecting members or surfaces increase in number because of the relay of the image, and the use of the objective lens creating the image at a finite position requires a negative lens to be incorporated in a revolver so that the image is relayed to infinity. Thus, there are problems that the number of lenses increases and an observation image becomes dark, with the result that flare and ghost are liable to occur.

SUMMARY OF THE INVENTION

It is, therefore, a primary object of the present invention to provide a microscope apparatus in which an image relay optical system is used to observe and photograph an image, pupil modulation can be produced so that various specimens are observed, and the optimum position of an eyepoint can be set.

Another object of the present invention is to provide a microscope apparatus in which flares is not produced, observation and handling are easy, and a plurality of persons can make observations simultaneously in comfortable positions.

According to one aspect of the present invention, the microscope apparatus has an objective lens, an imaging lens, a pupil relay lens, and an image relay lens, so that a primary image of a specimen is formed between the imaging lens and the pupil relay lens and the image of the pupil of the objective lens is projected between the pupil relay lens and the image relay lens, and has a pupil modulator at the position of the projected pupil image. The pupil relay lens, the image relay lens, and the pupil modulator constitute a relay optical system.

Further, the microscope apparatus of the present invention has an objective lens, an imaging lens, a pupil relay lens, and an image relay lens consisting of two lens units, so that a primary image of a specimen is formed between the imaging lens and the pupil relay lens and the image of the pupil of the objective lens is projected between a first lens unit and a second lens unit of the image relay lens, and has a pupil modulator at the position of the projected pupil image. The pupil relay lens, the image relay lens, and the pupil modulator constitute a relay optical system.

Still further, the microscope apparatus provided with the relay optical system for relaying the image formed by the objective lens includes a pupil relay lens having at least one positive lens element and an image relay lens having at least one positive lens element, so that a surface, closest to the specimen, of the pupil relay lens is configured into a convex surface and at least one surface of the lens elements constituting the image relay lens is configured into a convex surface.

The relay optical system can be used exclusive of the pupil modulator.

According to another aspect of the present invention, the microscope apparatus has an objective lens for relaying the image of a specimen to infinity, an imaging lens for forming the relayed image as a primary image, and an image relay optical system for relaying the primary image to form a secondary image in the vicinity of an eyepoint. The image relay optical system includes two lens units consisting of a front lens unit and a rear lens unit, between which the image is relayed to infinity, and the focal length of the rear lens unit is made equal to that of the imaging lens.

Thus, the position of the eyepoint can easily be adjusted by merely changing the space between the front and rear lens units of the relay lens system. Moreover, it is possible to use an infinite objective lens applied to the up-light microscope without using a particular magnification correcting optical system.

Further, the microscope apparatus includes an objective lens for relaying the image of a specimen to infinity, an imaging lens for forming the relayed image as a primary image, and an image relay optical system having a reflecting plane set at an acute angle between the imaging lens and the primary image and relaying the primary image to form a secondary image in the vicinity of an eyepoint. A lens system for moving the eyepoint along the optical axis is added to the image relay optical system. Moreover, between the primary and secondary images is formed an infinite optical path, from which a part, on the secondary image side, of the image relay optical system can be removed.

Thus, since a negative lens having been required in the past, inside the revolver, becomes unnecessary, the number of lenses will decrease. This makes it difficult to produce stray light such as ghost and flare which are detrimental to images. Furthermore, in the absence of the negative lens, aberration is not caused and thus good image performance can be obtained.

Still further, according to the present invention, a lens for pupil observation is removably disposed between the imaging lens and a binocular prism system which is included in the relay optical system. In this way, even with the inverted microscope involving three reflections, space required for optical paths for manipulators and laser microscopes can be widely taken. When a lens for pupil observation is placed close to the eyepoint, it can easily be handled without extending an operator's hand.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 18 is a view showing a sixth embodiment of the microscope apparatus according to the present invention;

FIG. 19 is a view showing a partial arrangement of the optical system of the sixth embodiment;

FIG. 20 is a view showing a seventh embodiment of the microscope apparatus according to the present invention;

FIG. 21 is a view showing a partial arrangement of the optical system of the seventh embodiment;

DETAILED DESCRIPTION OF THE PREFERRED EMBODIMENTS

Before undertaking the description of the embodiments, it will be expedient to explain the entire construction of the microscope apparatus according to the present invention. For simplicity, each of some lens systems which will be described below is simply expressed as "lens", for example, a pupil relay lens, an image relay lens, etc.

Figure 1:
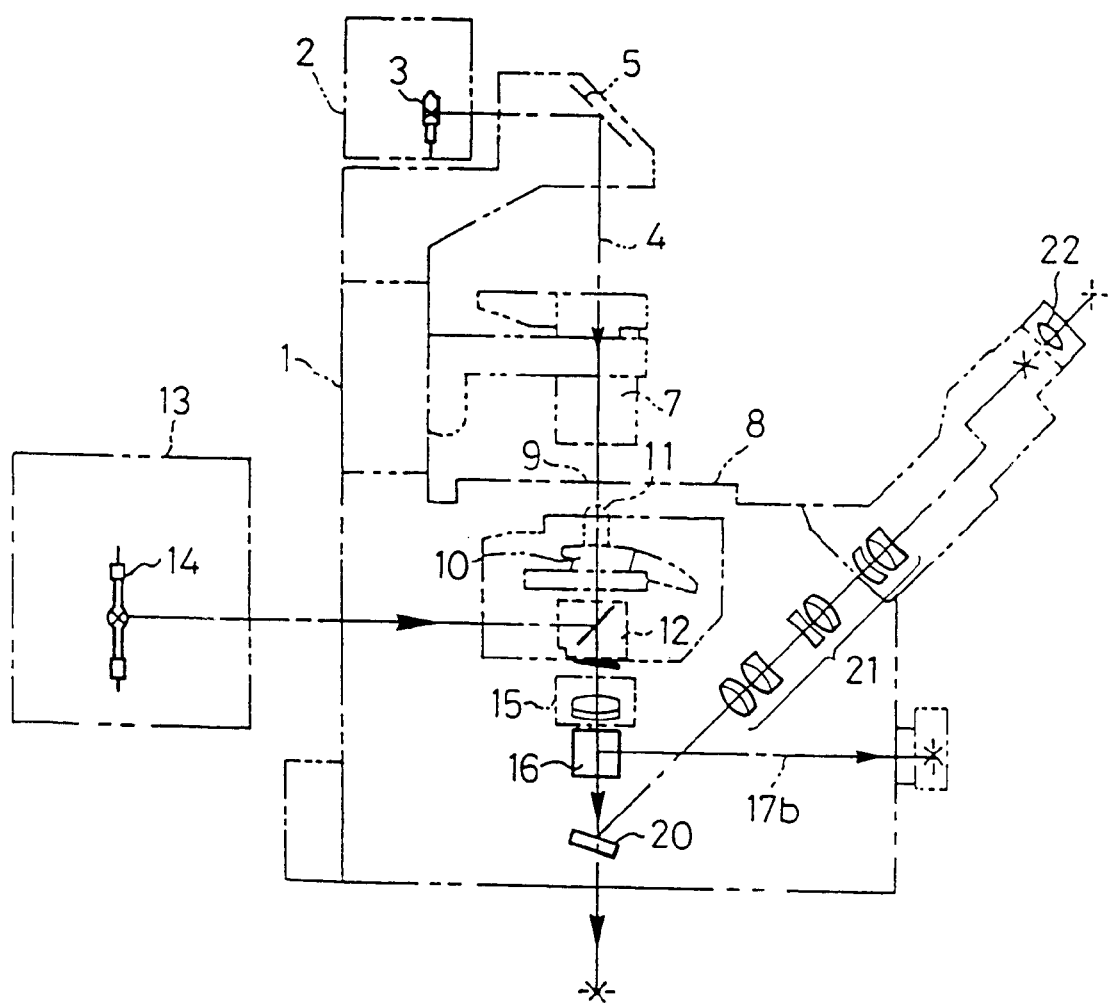
FIG. 1 is a schematic side view showing the entire construction of a microscope apparatus according to the present invention.
Figure 2:
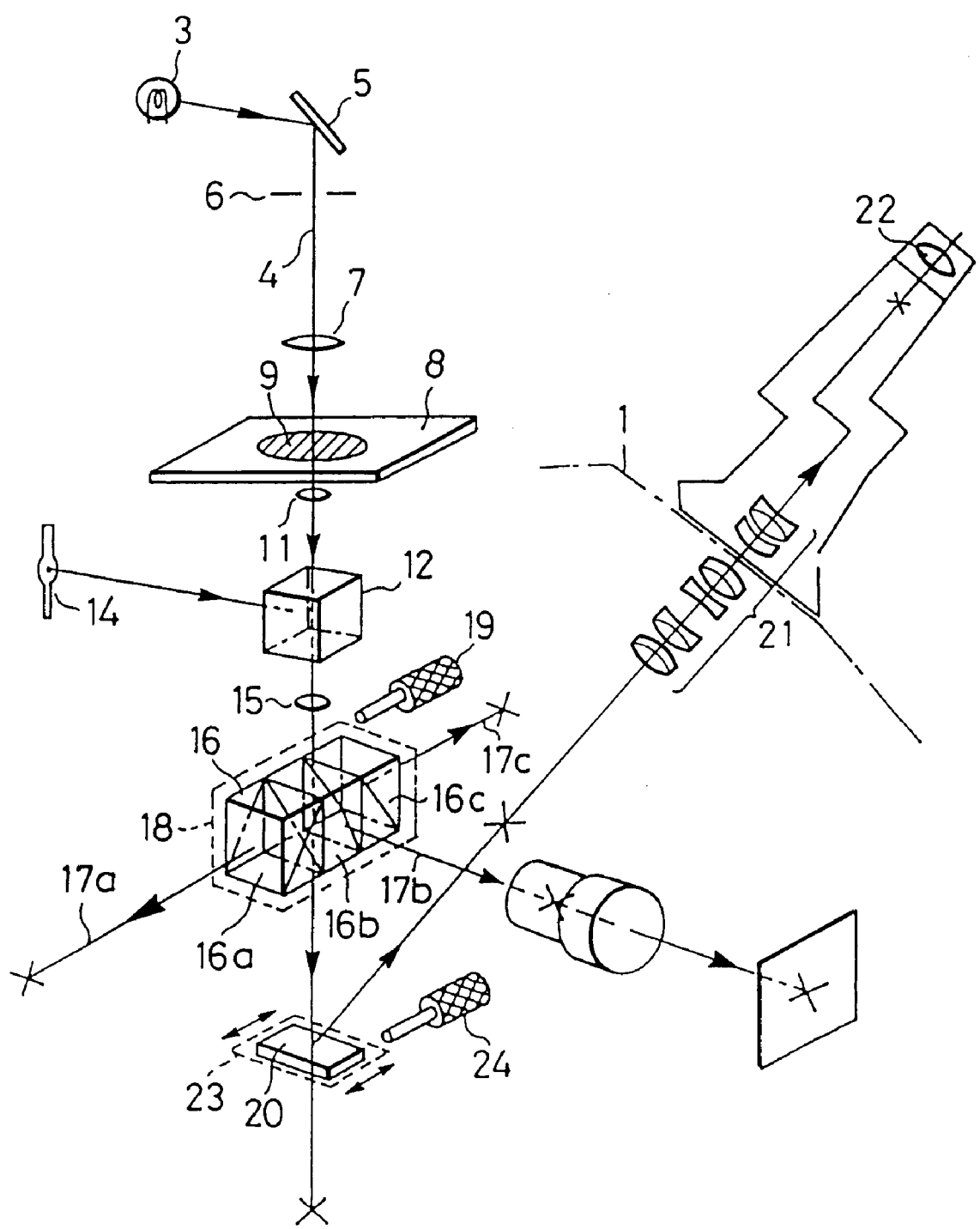
FIG. 2 is a view showing the arrangement of the optical system of the microscope apparatus of FIG. 1.
Figure 3:
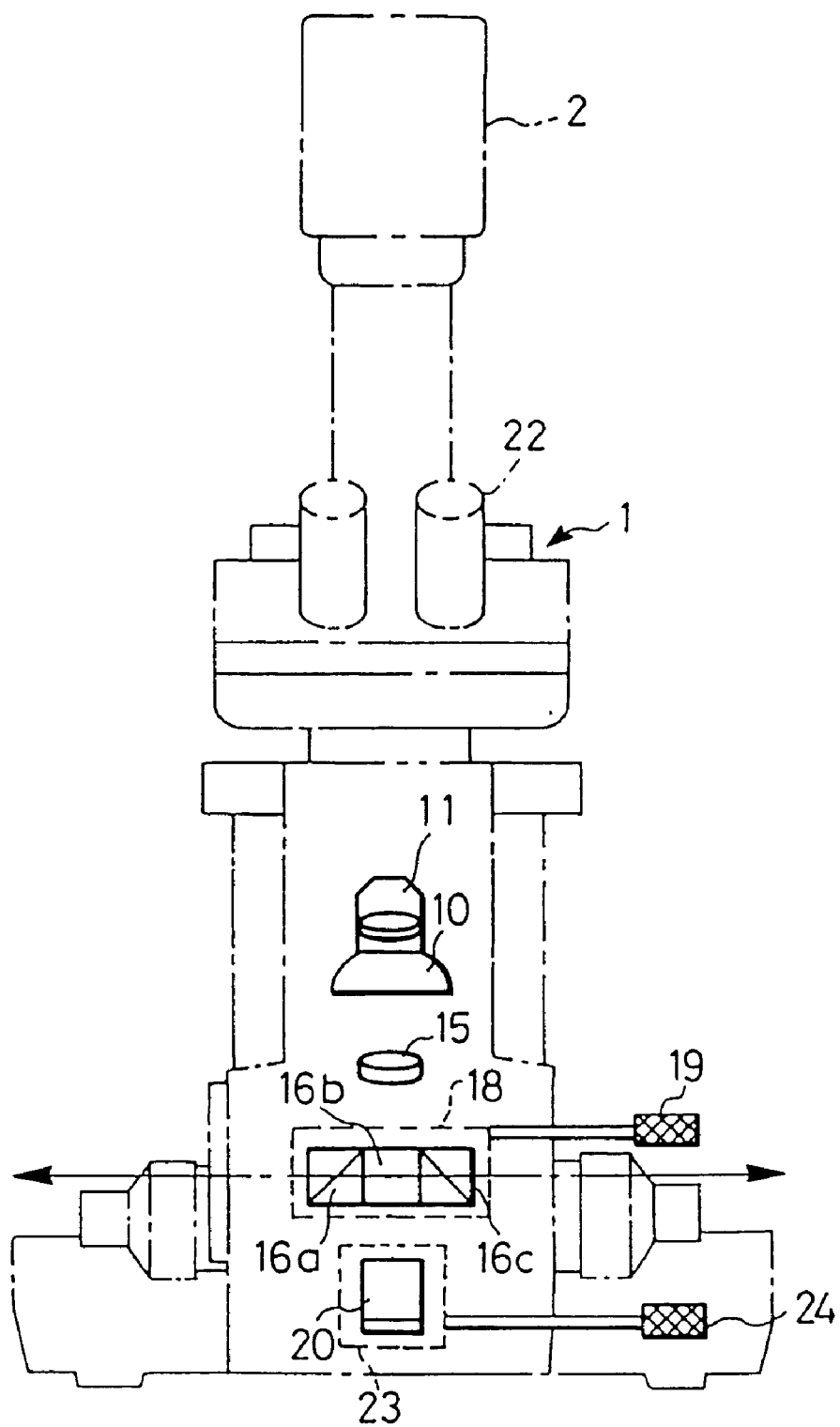
FIG. 3, is a schematic front view of the microscope apparatus of FIG. 1.

In FIGS. 1 to 3, light 4 emitted from a light source 3, which is incorporated in an illumination housing 2 mounted at the upper end of a microscope housing 1, is reflected by a reflecting mirror 5 to change the direction of illumination downward. The light 4 enters again the microscope housing 1, passes through a field stop 6 (FIG. 2), and is collected, by a condenser lens 7, onto a sample (specimen) 9 placed on a stage 8. The light, having traversed the sample 9, is incident on an objective lens 11 supported by a revolver 10 which is disposed at the lower position of the stage 8. The light of an enlarged image, having passed through the objective lens 11, is incident on a fluorescent cube 12 incorporating a dichroic mirror. The fluorescent cube 12 receives illumination light from a light source 14 of a reflecting illumination system 13. At the lower position of the fluorescent cube 12, is disposed an imaging lens 15, which images the light emerging from the objective lens 11 at the focus position of a relay optical system which will be described later. The light, having passed through the imaging lens 15 enters an optical element 16 described below.

The optical element 16, as shown in FIG. 2, is comprised of three semi-transmissive prisms 16a, 16b, and 16c which are arranged in contact with one another in a direction perpendicular to the optical axis. Each of the semi-transmissive prisms 16a, 16b, and 16c splits incident light in such a way as to transmit downward a part of the incident light from the upper side and conducts the remaining light in a direction which is perpendicular to the optical axis of the incident light and differs by 90° from adjacent split light. Specifically, the semi-transmissive prism 16a transmits downward a part of the incident light from the upper side and introduces the remaining light into a first photographing optical path 17a (the left direction in the figure). The semi-transmissive prism 16b situated at the middle transmits downward a part of the incident light from the upside and introduces the remaining light into a second photographing optical path 17b (the front direction). Similarly, the semi-transmissive prism 16c transmits downward a part of the incident light from the upper side and introduces the remaining light into a third photographing optical path 17c (the right direction).

The three semi-transmissive prisms 16a, 16b, and 16c are supported by a movable support 18 indicated by dotted lines in the figure. The semi-transmissive prisms 16a, 16b, and 16c are moved together by a position adjusting knob 19 whose tip protrudes from the outer wall of the microscope housing 1, so that their positions can be changed in three steps in a horizontal direction. Hence, by operating the position adjusting knob 19, any one of the semi-transmissive prisms 16a, 16b, and 16c can be selectively shifted to the position of the optical axis of the incident light. Consequently, an operator can introduce the light that has passed through the imaging lens 15 into any one of the first to third photographing optical paths 17a–17c.

Subsequently, the light transmitted through one of the three semi-transmissive prisms is reflected by a mirror 20, travels through a relay optical system 21 that has a pupil relay lens, a pupil modulator, and an image relay lens, and changes into a convergent beam to form an image. An eyepiece 22 is disposed at this image-forming position. The mirror 20 is supported by a frame 23 so that the orientation of the mirror 20 can be changed from the outside of the housing 1 by a knob 24 connected to the frame 23.

In this way, the microscope apparatus of the present invention, as mentioned above, includes the light source for illumination, the condenser lens for irradiating a specimen with light, the imaging lens for forming the image of the objective lens as the primary image, the pupil relay lens for relaying a pupil image, and the image relay lens for relaying the secondary image. Where the objective lens is used for relaying the image to infinity, the primary image of the specimen is formed between the imaging lens and the pupil relay lens, and the pupil image of the objective lens is projected between the pupil relay lens and the secondary image relay lens, so that the pupil modulator, such as a phase plate, a modulator for modulation contrast, or a Schlieren knife-edge, can be placed at the position where the pupil image is projected. Thus, pupil modulation techniques, such as phase-contrast observation, modulation contrast, and Schlieren methods, can be made without replacing the objective lens with another. Consequently, transparent objects like cultured cells can be favorably observed by various objectives ranging from an objective lens as high as about 250× in magnification, through an objective lens for dark field observation as low as about 1.2× in magnification, to an oil- or water-immersion objective lens for bright field observation.

Moreover, in the foregoing, when the image relay lens consists of two lens units, the pupil image of the objective lens is projected between the first lens unit and the second lens unit of the image reply lens, so that the pupil modulator, such as a phase plate, a modulator for modulation contrast, or a Schlieren knife-edge, can be placed at the position where the pupil image is projected. Consequently, transparent objects can be favorably observed in the same way as mentioned above.

In general, where the objective lens is provided with a pupil modulator which produces amplitude modulation as in a phase plate for phase difference and a modulator for modulation contrast, the amount of illumination light will be reduced by the absorption of light of the pupil modulator in a fluorescence observation. According to the present invention, however, the pupil modulator is placed in the relay system, included in the microscope body, which relays the image of the objective lens, and chromatic aberration and spherical aberration for the pupil of the relay system can be sufficiently corrected. In this way, the attenuation of the amount of light can be obviated which has been caused by the pupil modulation of the objective lens in the past.

In particular, in the case of an objective lens with a low magnification and long focal length, the pupil position is located on the image side of the mounting surface of the objective lens from the viewpoint of design of the objective lens. As a result, the pupil modulator which must be situated in the objective lens protrudes therefrom and thus must be placed in the revolver for objective exchange. This situation makes the rotation of the revolver difficult. According to the present invention, however, since the pupil modulator is situated midway between the lenses of the relay system, the observations of transparent objects by an objective lens with a magnification less than 4×, for example, as low as 2.5×, 2×, 1.25×, etc., can be favorably made which have been impossible in the past.

For phase-contrast and modulation contrast observations, it is necessary to use a condenser lens capable of illuminating a wide field and dispose an aperture for modulating illumination light at the position conjugate with the pupil of the objective lens, namely at the pupil position of the condenser lens.

The relay optical system which relays the image formed by the objective lens is provided with a pupil relay lens having at least one positive lens element and an image relay lens having at least one positive lens element to form the pupil image which is made divergent by the refractive power of the foremost convex surface on the primary image side, of the pupil relay lens, and to correct aberration for the pupil image by refracting surfaces subsequent to the foremost surface so that pupil modulation can be caused. Moreover, at least one surface of lens elements constituting the image relay lens is configured into a convex surface to thereby form the relayed image.

Rays of light incident on the objective lens are usually telecentric. When the rays leave the objective lens and the imaging lens to form the primary image, the image is not formed by telecentric rays in most cases. The relay system of the primary image should be constructed to have the pupil relay lens in order to control the position and magnification of pupil projection. Furthermore, for the eyepiece. It is desirable that correction for aberration is made in view of the position of the exit pupil.

in the present invention, when the image relay lens of the image relay optical system is designed to include two lens units and relay the image to infinity between the two lens units, such a relay optical system, because its overall length can be changed, is used in various design units. The relay optical system of the microscope apparatus according to the present invention can be used in the inverted microscope, as well as in the up-light microscope, as an optical system for using optical paths in four directions. It has an application in at least one optical path of a quadriocular lens barrel capable of allowing the changeover to each of an observation optical path for the naked eye, a photographing optical path, and a TV camera optical path. In this case, when the relay optical system is designed so that a pupil modulator can be inserted therein, pupil modulation becomes possible. The relay optical system can also be used as an image relay optical system for tilting binoculars to adjust the position of the eyepoint to an observer's eyes.

Furthermore, the above-mentioned relay optical system can also be used as a relay optical system for two-image photographing optical systems, irrespective of the up-light or inverted microscope, to provide a microscope with two cameras or photographic devices. The optical feature of the relay optical system is that although the pupil relay lens may be constructed with one lens unit, it is preferable that when a complete correction for spherical aberration for a pupil is required, the pupil relay lens is composed of two lens units. When the limit of a pupil projection magnification β is particularly defined as $$0.4 \leq \beta \leq 1.1 \qquad (1)$$

it is preferable that at least one of two lens units of the pupil projecting lens is shaped into a meniscus form to facilitate correction for spherical aberration for the pupil. Here, the pupil projection magnification means a value found in such a way that, for example, when a point located 5 mm from the mounting surface of the objective lens toward the specimen is regarded as a virtual object point, light from the virtual object point is transmitted through the imaging lens and the pupil relay lens, and then forms the image of the virtual object point.

Where correction for chromatic aberration for the pupil is required, it is favorable that at least one cemented lens unit is provided. In this case, if $Dv \geq 6$, where $Dv$ is the difference in Abbe's number between the positive lens and the negative lens constituting the cemented lens unit, chromatic aberration for the pupil can be reduced to a minimum.

In order to correct the image of the relay optical system for its flatness, it is desirable that the first lens unit of the image relay lens be at least one negative lens unit. This negative lens unit diminishes the Petzval sum of the entire relay optical system, and thereby curvature of field is corrected.

The condenser lens requires an aperture for phase difference or modulation contrast to produce the modulation of illumination. It is favorable that the condenser lens be designed so that the apertures of various sizes and shapes can be mounted and dismounted. In the case of the phase difference, for example, an illumination system is used which is capable of illuminating the actual field of the objective lens used, and a zone aperture is disposed at the position conjugate with the pupil of the objective lens in the condenser. For the modulation contrast observation, a rectangular aperture is placed at the position conjugate with the pupil of the objective lens in the condenser. As for the Schlieren observation, a knife-edge is disposed at the position conjugate with the pupil of the objective lens in the condenser.

The arrangement of the image relay lens includes a front lens unit for projecting the primary image at infinity and a rear lens unit for forming this projected image at a finite distance, so that beams of light are made parallel between the front and rear lens units and thereby the space between them can be changed. In this way, the position of the eyepoint can be varied without changing the image magnification. Consequently, the position of the eyepoint can be set in accordance with various figures of observers.

Since the microscope apparatus of the present invention is designed so that an objective lens for infinity can be used, a Nomarski prism can be placed immediately behind (on the image side of) the objective lens. Therefore, a Nomarski system for up-light microscopes can also be used, with the resultant relatively low cost.

With the use of the objective lens for infinity in the microscope apparatus of the present invention, when a space between the imaging lens and the objective lens is set to 50 mm or more, it is possible to insert, in this space, a dichroic mirror for providing reflecting illumination from a projection tube for fluorescence illumination, a Nomarski prism, a polarizing plate for observing polarization, etc. On this way, various observing methods are available.

Moreover, in the microscope apparatus of the present invention, if a pupil modulator is prepared which is most suitable for microscopy of cells, in vivo, cultured in a plastic Erlenmeyer flask and of cultured cells, and is only inserted in the relay optical system, an optimum contrast for the vessel can be obtained without replacement of the objective lens. Since in practice the optimum position of the pupil modulator in the direction of the optical axis is slightly changed by errors, notably index errors, of optical elements used in the relay optical system, it is desirable that the pupil modulator is designed so that fine adjustment can be made along the optical axis.

In order to obviate interference between the pupil modulator and the pupil relay lens or the image relay lens and the optical system, it is favorable that the pupil modulator is located at a distance of at least 5 mm from a lens element. Otherwise, interference will occur when objective lenses having different pupil positions are used.

The pupil position of an objective lens depends on the application of the magnification, numerical aperture, field number, or flatness and the performance of the objective lens, and in fact, is shifted by about ±35 mm from the mounting surface of the objective lens. Therefore, when various objective lenses are employed, a limit A of the position where a pupil filter ring element is located can be found from A=(Moving distance of the pupil position of an objective lens used)×(square of pupil projection magnification) (2)

It is rare that the centers of curvature of all optical elements of the relay optical system and the objective lens are situated on the optical axis, and in most cases, they deviate from the optical axis in accordance with tolerances of the optical elements. Because of this deviation, the optimum position of the pupil modulator varies according to the combination of the objective lens and the relay optical system. Hence, it is desirable that the pupil modulator is constructed so that it can be centered in a direction normal to the optical axis.

The microscope apparatus of the present invention is adapted to observe cells from the lower portion of a culture vessel for microscopy of cultured cells in vivo. Thus, unless a reflecting member is disposed between the specimen and the primary image, the position of the eyepoint becomes very low with respect to the specimen. It is possible to elevate the position of the eyepoint by providing at least one reflecting surface between the specimen and the primary image. In order to obtain the optimum eyepoint, it is desirable that the position of the eyepoint is set equivalent to that of the specimen, or higher. In doing so, a specimen image and an actual specimen can be observed only by slightly moving an observer's head.

in the microscope apparatus of the present invention, if the focal length of the imaging lens is set to nearly 180 mm, satisfactory optical performance can be secured in the visual field of a field number of 20 or more. In order to obtain good imaging performance, the focal length of the imaging lens should be 150–200 mm. in doing so, favorable performance can be ensured with objective lenses ranging from an extremely low magnification to a magnification of about 250× at a parfocal length of 45. Where various objective lenses with infinite beams, proposed by the same applicant as in the present application, are used, optimum optical properties and magnification can be secured if the focal length of the imaging lens is nearly 180 mm. Also, where an objective lens with a finite emergent beam is used, it is necessary to insert a lens for making the emergent beam infinite between the objective lens and the imaging lens. In this case, unless the focal length of the imaging lens required for imaging this light beam is set to about 100–160 mm, the formation of an image at a magnification of 1× becomes difficult.

When the pupil position of the objective lens is located at a distance of 5 mm from the mounting position of the objective lens toward the specimen, it is desirable that the pupil projection magnification β of the relay optical system satisfies Eq. (1). If the magnification β is made smaller than 0.4, the overall length of the optical system relaying the primary image to the secondary image becomes much shorter and it is difficult to bring about the optimum eyepoint position. If, conversely, the magnification β is made larger than 1.1, the overall length of the relay optical system will be much longer and the position of the eyepoint will be higher.

When the moving limit of the pupil is ±3.5 mm in terms of the pupil projection magnification β of the relay optical system, the limit A within which a pupil modulator can be inserted is derived from the relation of Eq. (2). Thus, the limit within which the pupil modulator situated adjacent to the pupil relay lens or the image relay lens can be inserted is chosen so as to satisfy the condition $$6.3 \leq A \quad (3)$$

and pupil modulation by an objective lens having a different pupil position becomes possible. In this case, if a distance from the last surface of lens units situated on the specimen side of the pupil modulator to the first surface of lens units on the image side thereof satisfies the value of the limit A in Eq. (3), interference between the pupil modulator and the lenses will not be caused, and hence pupil modulation can be produced with objective lenses having various pupil positions.

When the focal length of the rear lens unit of the image relay lens is represented by F and a beam of light incident on the image relay lens is to be infinite, it is preferable that a focal length $F_p$ of the pupil relay lens is defined as $$F/3.5 \leq F_p \leq F/1.1 \quad (4)$$

In this way, a pupil relay lens which is free from aberration can be designed. In inverted microscopes, if the focal length $F_p$ deviates from the limit of Eq. (4), the construction for microscopes becomes difficult in view of paraxial focus and aberration as well. In particular, it is preferable that the position of the pupil modulator is not shifted along the optical axis in accordance with the shift of the pupil position of the objective lens. Consequently, a space required for the phase plate or the like can be narrowed, and thus compact design can be achieved. The limit of a value satisfying an optimum pupil projection magnification βM in this case is given by $$0.3 \leq \beta_M \leq 0.8 \tag{5}$$

The structure of the optimum pupil modulator varies with the magnification, numerical aperture, and pupil position of the objective lens or a specimen to be observed. In such an instance, it is desirable that the pupil modulator includes a mechanically constructed slider or turret which is capable of replacing at least two kinds of apertures with each other. Moreover, if the pupil modulator is designed to be replaceable with respect to the slider or turret, various types of modulators can be used. A modulation contrast image, unlike a phase-contrast image, requires a modulator to be turned in order to adjust the direction in which a contrast is caused to the image of a transparent object. In this case, the unit of the slider or turret is designed so that it can be removed from the microscope body, and thereby a desired unit is obtained. This design has the advantage that it is possible to mount a modulation contrast unit capable of turning the modulator by the slider or turret and a slider or turret for phase difference which can only center the modulator in a direction perpendicular to the optical axis.

Furthermore, the image relay lens is constructed with two lens units, a first lens unit for projecting the primary image at infinity and a second lens unit for relaying this projected image to a finite distance. In this case, the arrangement is such that the lens barrel is removed from the microscope body between the first and second lens units. As such, a lens barrel for photography as well as for observation can be mounted, thus enabling an image modulated by the pupil modulator to be introduced into a photographic device. In addition, if the arrangement is such that a ray of light emerging from the first lens unit of the image relay lens can be conducted in a direction perpendicular to the stage surface by a prism, binoculars for up-light microscopes incorporating the second lens unit of the image relay lens can be used. Similarly, a photographic device for up-light microscopes can also be used.

A further feature of the present invention is that even where cells placed in the culture vessel of plastic are observed, polarization performance is not deteriorated by the vessel because phase-contrast and modulation contrast microscopes and the Schlieren method are employed. The use of an illumination system with a great numerical aperture makes it possible to make a dark field observation by an objective lens with a low magnification less than 4× which has been impossible for the conventional phase-contrast microscope. This is because the numerical aperture of the ring slit of phase-contrast aperture is larger than that of the objective lens.

In accordance with the embodiments shown, the present invention will be explained in detail below.

First Embodiment

Figure 4:
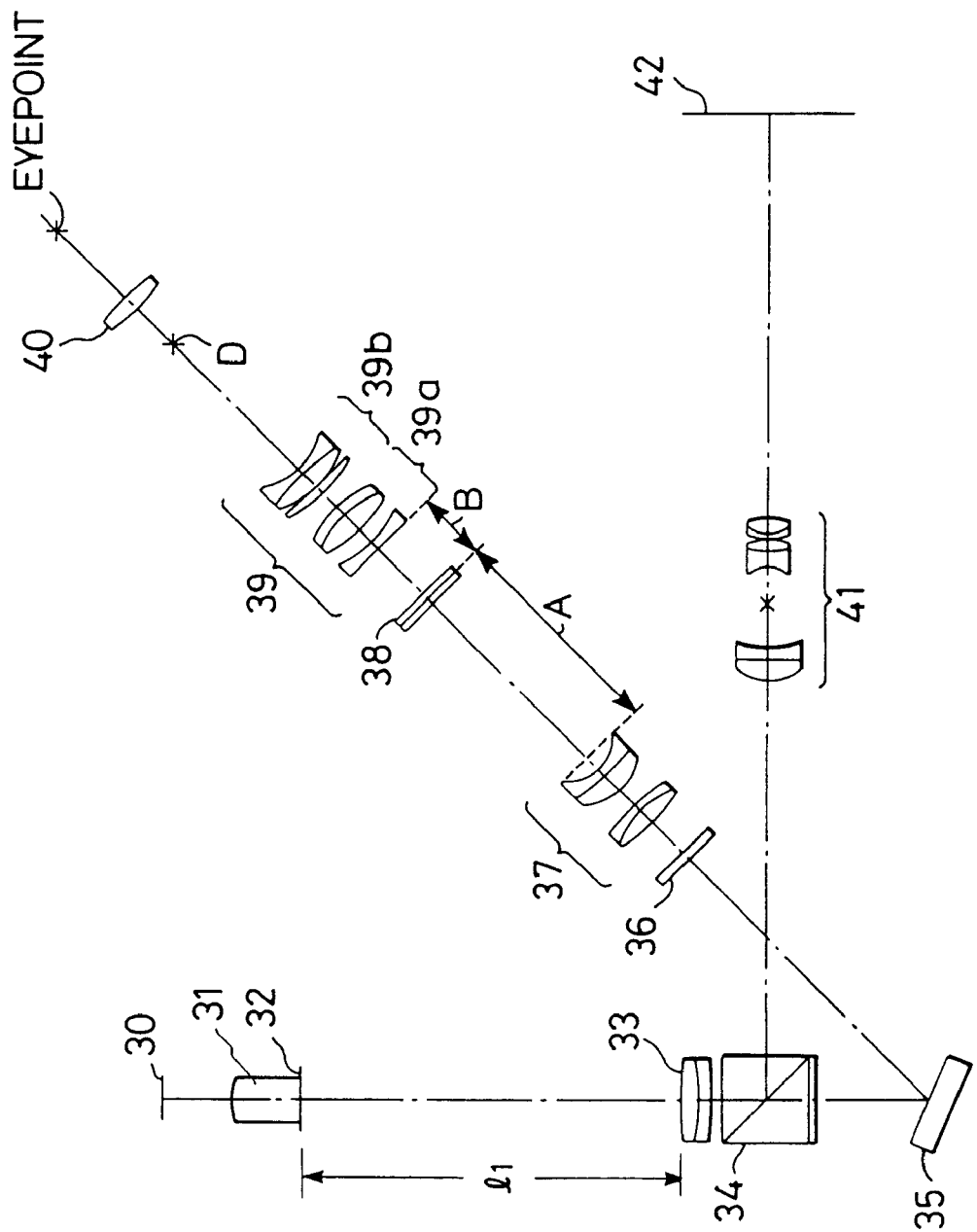
FIG. 4 is a view showing the arrangement of an optical system in a first embodiment of the microscope apparatus according to the present invention.

FIG. 4 shows the optical arrangement, along the optical axis, of the first embodiment of the microscope apparatus according to the present invention. The microscope apparatus in the first embodiment is adapted to set the optimum position of the eyepoint with a minimum number of reflections of an image in a microscope for observing a transparent object. In the microscope apparatus, as shown in FIG. 4, light emerging from a specimen 30 and transmitted through an objective lens 31 attached to a mounting position 32 thereof forms an image at infinity. The image relayed to infinity is incident on an imaging lens 33. The light leaving the imaging lens 33 is transmitted through the prism 34, and after being reflected by a reflecting mirror 35, forms a primary image at a primary imaging plane 36. This image is relayed by a pupil relay lens 37 and reaches a pupil modulator 38, which is placed at a position conjugate with the pupil position of the objective lens 31. The light emerging from the pupil modulator 38 is incident on an image relay lens 39. The image relay lens 39, composed of two lens units, is such that the light leaving a first lens unit 39a is relayed to infinity, enters a second lens unit 39b, and is brought into a convergent beam by the power of the second lens unit 39b to form an image. In the vicinity of this image-forming position, an eyepiece 40 is disposed.

The first and second lens units 39a and 39b of the image relay lens 39 are designed to be an afocal system and hence, even though a space between the first and second lens units 39a and 39b is altered, the position of the eyepoint can be changed independently of magnification. For the objective lens 31, various types of lenses designed for infinity are available. The focal length of the imaging lens is 180 mm. in FIG. 4, reference symbols A and B denote the limits of the position where the pupil modulator can be located (the same is said of the other embodiments which will be described below).

Figure 5:
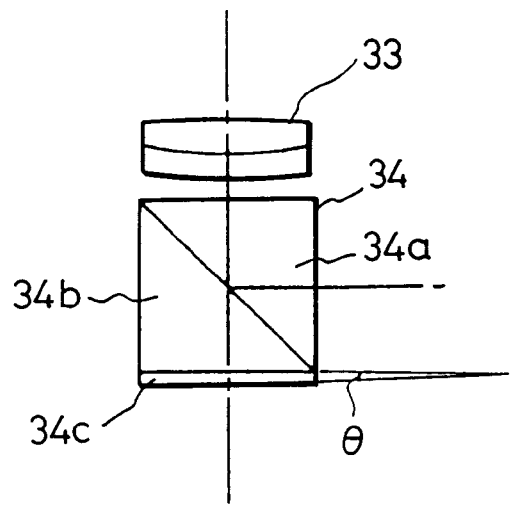
FIG. 5 is an explanatory view showing a prism used in the optical system of the first embodiment.

In order to photograph the image of the specimen 30, the microscope apparatus of the first embodiment is designed so that the image formed by the imaging lens 33 is reflected by the prism 34 and is introduced into a photographic lens 41 to fall on a photographic image plane 42. As shown in FIG. 5, it is advisable to construct the prism 34 with three prism elements cemented to one another. Specifically, if the refractive indices of prism elements 34a and 34b are slightly different, a ray of light will be refracted by their interface. As a result, the ray will deviate from its axial center. If, therefore, a prism element 34c having a slight wedge angle θ (2°<θ<30° is desirable) is cemented as shown in the figure, thereby making a centering adjustment, the ray transmitted through the prism 34 will not be decentered.

Figure 6:
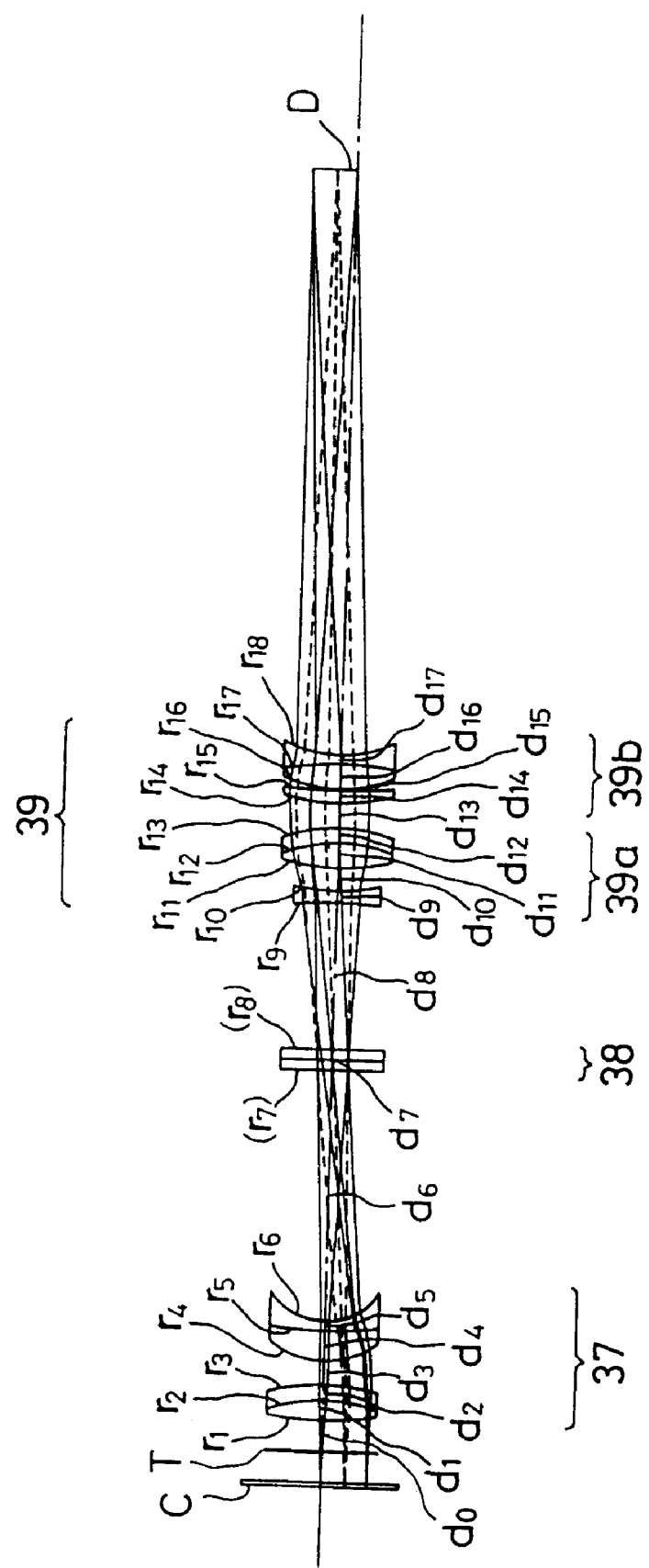
FIG. 6 is a view showing the arrangement, along the optical axis, of a relay optical system used in the optical system of the first embodiment.

A relay optical system used in the microscope apparatus of the first embodiment is explained with reference to FIG. 6. The relay optical system, which is adapted to relay the primary image, consists of the pupil relay lens 37 and the image relay lens 39 and has a removable pupil modulator 38 between them. Furthermore, by constructing the pupil relay lens 37 with two lens units, the pupil projection magnification can be set to a desired value and aberration for the pupil is completely corrected. In particular, a meniscus lens is employed in a second lens unit of the pupil relay lens 37, and thereby aberration can be completely corrected for the pupil. In FIG. 6, reference symbol C represents the position of the primary image plane 36, D represents the position of a real image formed in front of the eyepiece 40, and T represents a reticle.

The following are the numerical data of lenses of the relay optical system of the microscope apparatus according to the first embodiment.

Figure 7:
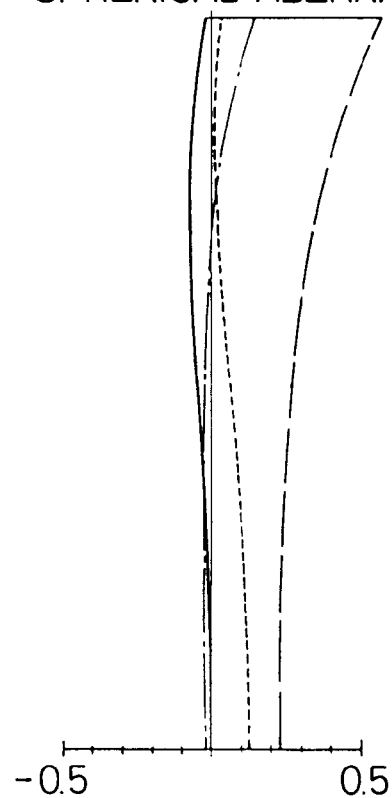
FIG. 7 is a diagram showing spherical aberration of the relay optical system of FIG. 6.

Magnification = 1, Numerical aperture = 0.04,
Image height = 11,
Focal length of the pupil relay lens 37 = 87.017,
Focal length of the first lens unit 39a of the image relay lens 39 = 166.558,
Focal length of the second lens unit 39b of the image relay lens 39 = 180, -continued Pupil projection magnification $\beta = 0.5626$
Objective-to-imaging lens distance $l_1 = 120$,
Thickness d of the reticle $T = 1.5$,
Limit $A = 40$, Limit $B = 20$ $d_0 = 17.7569$
$r_1 = 80.631$
$d_1 = 5.2$ $n_1 = 1.60311$ $\nu_1 = 60.7$
$r_2 = -33.5740$
$d_2 = 2.7$ $n_2 = 1.80518$ $\nu_2 = 25.43$
$r_3 = -86.478$
$d_3 = 7.5$
$r_4 = 20.316$
$d_4 = 7.11$ $n_4 = 1.744$ $\nu_4 = 44.73$
$r_5 = 130.487$
$d_5 = 2.97$ $n_5 = 1.741$ $\nu_5 = 52.68$
$r_6 = 14.935$
$(d_6 + d_7 + d_8) = 107.09$
$r_9 = -172.563$
$d_9 = 3.24$ $n_9 = 1.50847$ $\nu_9 = 60.83$
$r_{10} = 38.325$
$d_{10} = 5.72$
$r_{11} = 51.848$
$d_{11} = 7.51$ $n_{11} = 1.456$ $\nu_{11} = 90.31$
$r_{12} = -27.45$
$d_{12} = 3.04$ $n_{12} = 1.50847$ $\nu_{12} = 60.83$
$r_{13} = -39.564$
$d_{13} = 35.1631$
$r_{13} = 54.9349$
$d_{14} = 3$ $n_{14} = 1.48749$ $\nu_{14} = 70.2$
$r_{15} = 278.88$
$d_{15} = 0.3359$
$r_{16} = 32.9209$
$d_{16} = 6$ $n_{16} = 1.72342$ $\nu_{16} = 37.95$
$r_{17} = -90.9349$
$d_{17} = 2.6$ $n_{17} = 1.7185$ $\nu_{17} = 33.52$
$r_{18} = 25.9272$ FIG. 7 is a spherical aberration diagram where the pupil is projected by the relay optical system shown in FIG. 6.

Second Embodiment

Figure 8:
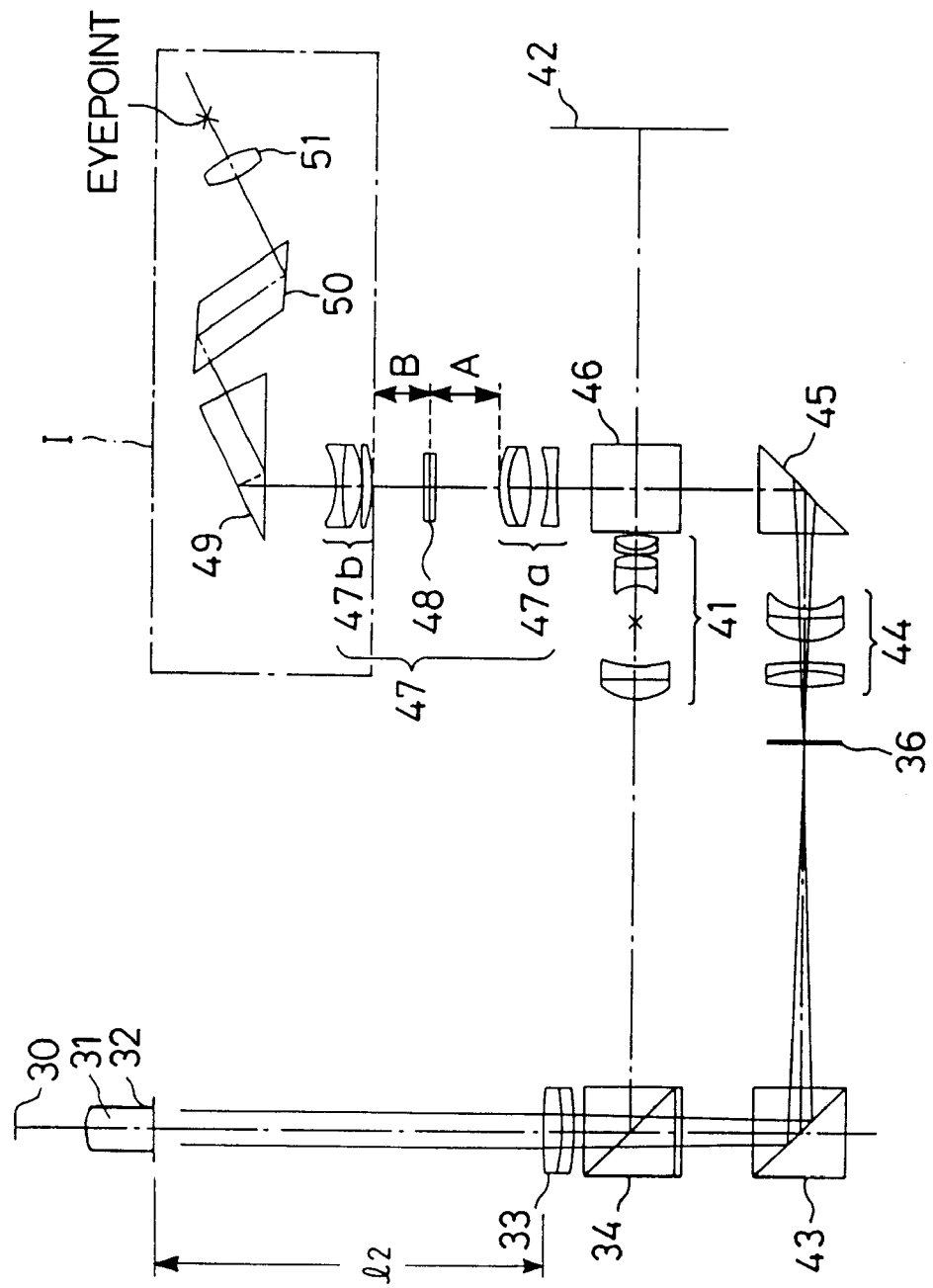
FIG. 8 is a view showing the arrangement of an optical system in a second embodiment of the microscope apparatus according to the present invention.

FIG. 8 shows the optical arrangement, along the optical axis, of the microscope apparatus in the second embodiment. The second embodiment offers an example of the microscope apparatus in which the optical path is formed into a U-shaped system. The microscope apparatus, as shown in FIG. 8, is such that light emerging from the specimen 30 and transmitted through the objective lens 31 attached to the mounting position 32 thereof is incident on the imaging lens 33 and is subjected to a convergent action. The light leaving the imaging lens 33 is transmitted through the prism 34 and after being reflected by a prism 43, forms the primary image at the primary imaging plane 36. This image is relayed by a pupil relay lens 44, and after being reflected by a prism 45 and transmitted through a prism 46, enters an image relay lens 47. The image relay lens 47 is composed of two lens units of a first lens unit 47a and a second lens unit 47b. The light emerging from the first lens unit 47a is relayed to infinity and arrives at a pupil modulator 48 disposed, at a position conjugate with the pupil position of the objective lens 31, between the first and second lens units 47a and 47b. The light from the pupil modulator 48 is incident on the second lens unit 47b of the image relay lens 47 and is brought into a convergent beam by the power of the second lens unit 47b. This beam is imaged through a prism 49 for introducing the optical path of the up-light microscope into the eyepoint of the inverted microscope and a prism 50 for splitting the optical path into two. At this imaging position, an eyepiece 51 is disposed.

The first and second lens units 47a and 47b of the image relay lens 47 are designed to be an afocal system and hence, even though a space between the first and second lens units 47a and 47b is altered, the position of the eyepoint can be changed independently of magnification. For the objective lens 31, various types of lenses designed for infinity are available.

In order to photograph the image of the specimen 30, the microscope apparatus of the second embodiment is designed so that the image formed by the imaging lens 33 is reflected by the prism 34 and is introduced into the photographic lens 41 to fall on the photographic image plane 42 through the prism 46. The prism 34 is constructed as shown in FIG. 5.

A relay optical system used in the microscope apparatus of the second embodiment is explained with reference to FIG. 9. As shown in this figure, the relay optical system, which is adapted to relay the primary image, consists of the pupil relay lens 44 and the image relay lens 47 and has a removable pupil modulator 48 between the first and second lens units 47a and 47b of the image relay lens 47. Also, reference symbol E denotes the position of the primary imaging plane 36 and F denotes the position of a real image formed in front of the eyepiece 51. By using negative lenses in the image relay lens 47, the Petzval sum can be diminished and thus curvature of field is reduced to a minimum, with the resultant good image performance.

The following are the numerical data of lenses of the relay optical system of the microscope apparatus according to the second embodiment.

Figure 9:
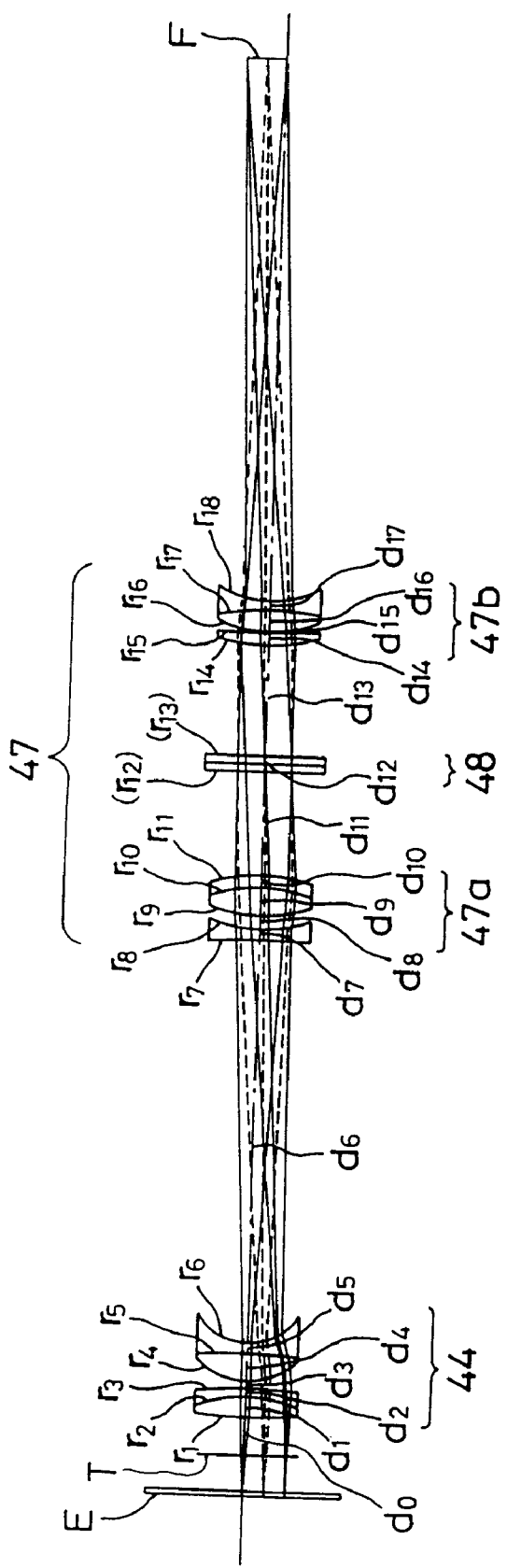
FIG. 9 is a view showing the arrangement, along the optical axis, of a relay optical system used in the optical system of the second embodiment.
Figure 10:
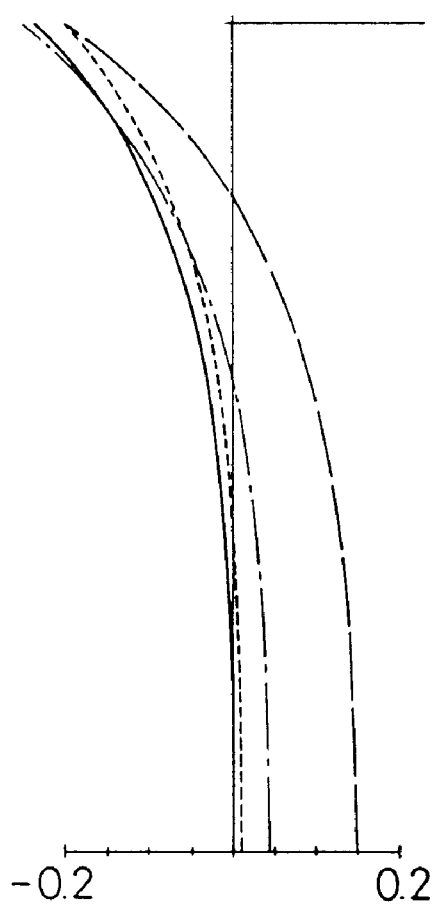
FIG. 10 is a diagram showing spherical aberration of the relay optical system of FIG. 9.

Magnification = 1, Numerical aperture = 0.04,
Image height = 11,
Focal length of the pupil relay lens $44 = 159.361$,
Focal length of the first lens unit 47a of the image relay lens $47 = 158.205$,
Focal length of the second lens unit 47b of the image relay lens $47 = 180$,
Pupil projection magnficiation $\beta = 1$,
Objective-to-imaging lens distance $l_2 = 120$,
Thickness d of the reticle $T = 1.5$,
Limit $A = 15$, Limit $B = 16$ $d_0 = 20.9313$
$r_1 = 155.6537$
$d_1 = 5.2$ $n_1 = 1.60311$ $\nu_1 = 60.7$
$r_2 = -40.875$
$d_2 = 2.7$ $n_2 = 1.80518$ $\nu_2 = 25.43$
$r_3 = -132.1773$
$d_3 = 2.06$
$r_4 = 20.5389$
$d_4 = 7.11$ $n_4 = 1.744$ $\nu_4 = 44.73$
$r_5 = -239.3961$
$d_5 = 2.97$ $n_5 = 1.741$ $\nu_5 = 52.68$
$r_6 = 15.3642$
$d_6 = 109.996$
$r_7 = -379.9577$
$d_7 = 3.24$ $n_7 = 1.50847$ $\nu_7 = 60.83$
$r_8 = 38.1733$
$d_8 = 3.5841$
$r_9 = 44.4761$
$d_9 = 7.51$ $n_9 = 1.456$ $\nu_9 = 90.31$
$r_{10} = -34.2314$
$d_{10} = 3.04$ $n_{10} = 1.50847$ $\nu_{10} = 60.83$
$r_{11} = -46.6517$
$(d_{11} + d_{12} + d_{13}) = 65$
$r_{14} = 54.9349$
$d_{14} = 3$ $n_{14} = 1.48749$ $\nu_{14} = 70.2$
$r_{15} = 278.88$
$d_{15} = 0.3359$
$r_{16} = 32.9209$
$d_{16} = 6$ $n_{16} = 1.72342$ $\nu_{16} = 37.95$
$r_{17} = -90.9349$
$d_{17} = 2.6$ $n_{17} = 1.7185$ $\nu_{17} = 33.52$
$r_{18} = 25.9272$ FIG. 10 is a spherical aberration diagram where the pupil is projected by the relay optical system shown in FIG. 9.

Third Embodiment

Figure 11:
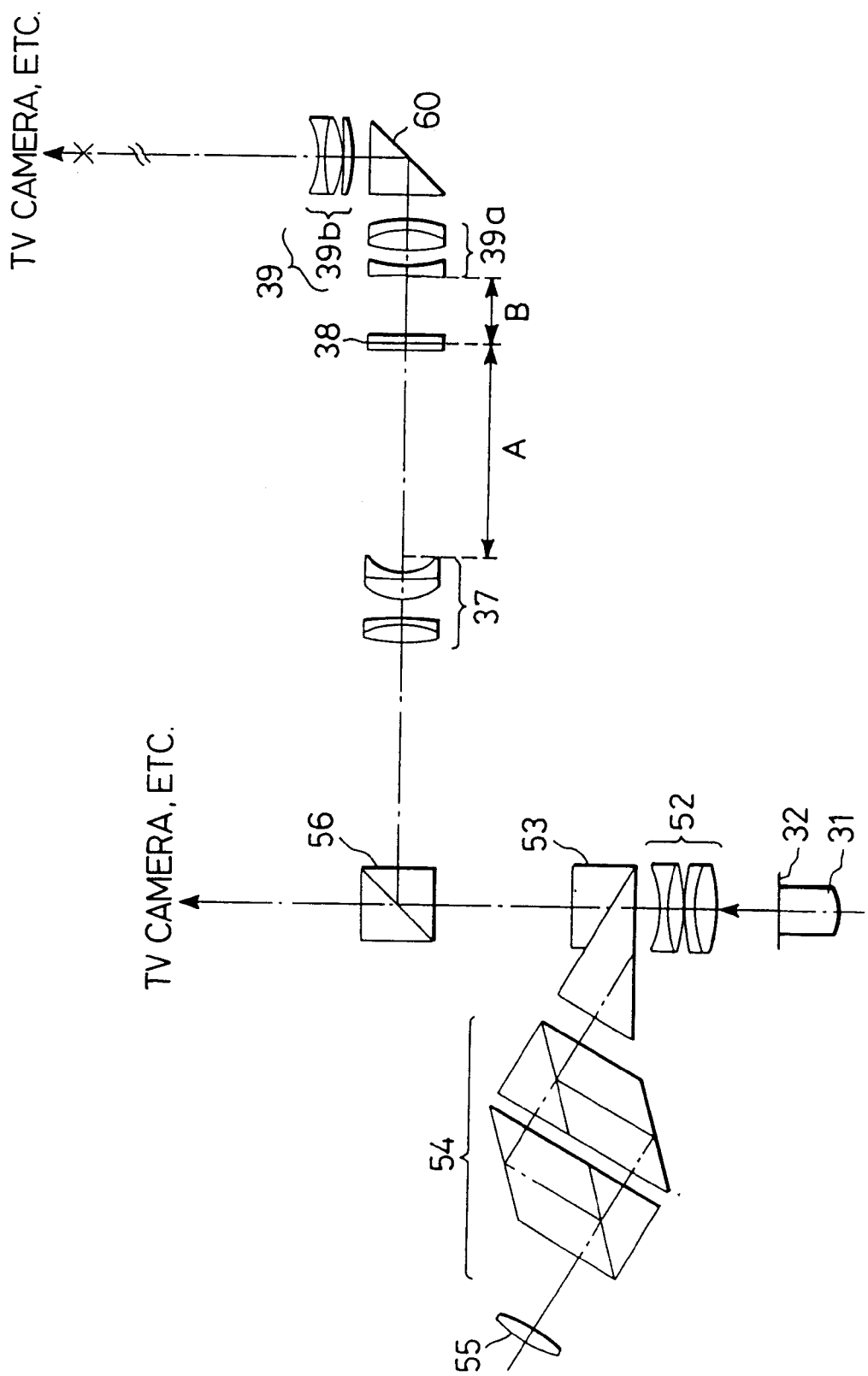
FIG. 11 is a view showing the arrangement of an optical system in a third embodiment of the microscope apparatus according to the present invention.

FIG. 11 shows the optical arrangement, along the optical axis, of the microscope apparatus in the third embodiment. The third embodiment is constructed by combining a binocular prism system for up-light microscopes with the relay optical system. The binocular prism is used for the purpose of splitting the optical path into four. In the third embodiment, as shown in the figure, the following three optical paths are formed. The first is a binocular optical path for observation in which part of rays of light, converged by the imaging lens 52 relaying a real image through the objective lens 31, or its relaying image, to infinity, is introduced into a binocular prism system 54 by a path splitting prism 53, and at the imaging position of this ray, an eyepiece 55 is disposed. The second is a first photographing optical path in which part of the other rays transmitted through the path splitting prism 53 is introduced, through a path splitting prism 56, into a TV camera or photographic device, not shown. The third is a second photographing optical path in which a remaining ray reflected from the path splitting prism 56 is relayed by the pupil relay lens 37, incident through the pupil modulator 38 on the first lens unit 39a of the image relay lens 39, relayed to infinity, reflected by a reflecting prism 60 interposed between the first and second lens units 39a and 39b of the image relay lens 39 to enter the second lens unit 39b, brought into a convergent beam by the power of the second lens unit 39b, and introduced into a TV camera or photographic device, not shown.

Figure 12:
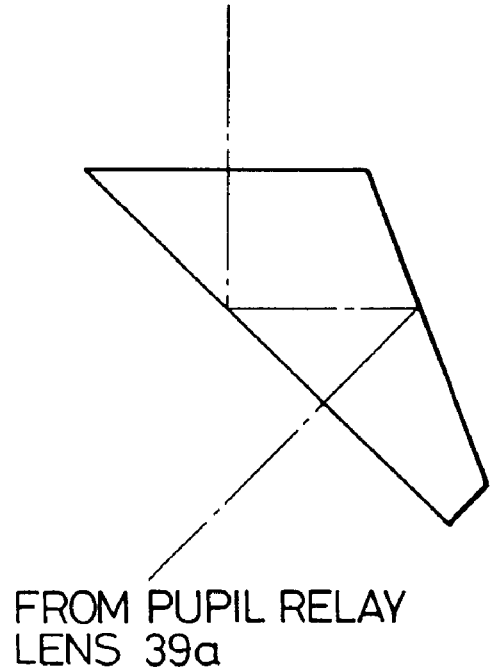
FIG. 12 is a view showing a prism additionally disposed in the optical system of the third embodiment.

The relay optical system of the third embodiment is constructed in almost the same manner as that of the first embodiment (see FIG. 6). If a prism shown in FIG. 12 is placed on a ray emerging from the first lens unit 39a of the image relay lens 39 of the optical system shown in FIG. 4, the optical system of FIG. 11 can be used behind this prism. By doing so, more TV cameras or photographic devices can be employed. The binocular prism system can be used in the optical system shown in FIG. 8. In this case, however, the optical system of FIG. 11 is used instead of a binocular system indicated by symbol I in FIG. 8. By doing so, more TV cameras or photographic devices can be used.

Fourth Embodiment

Figure 13:
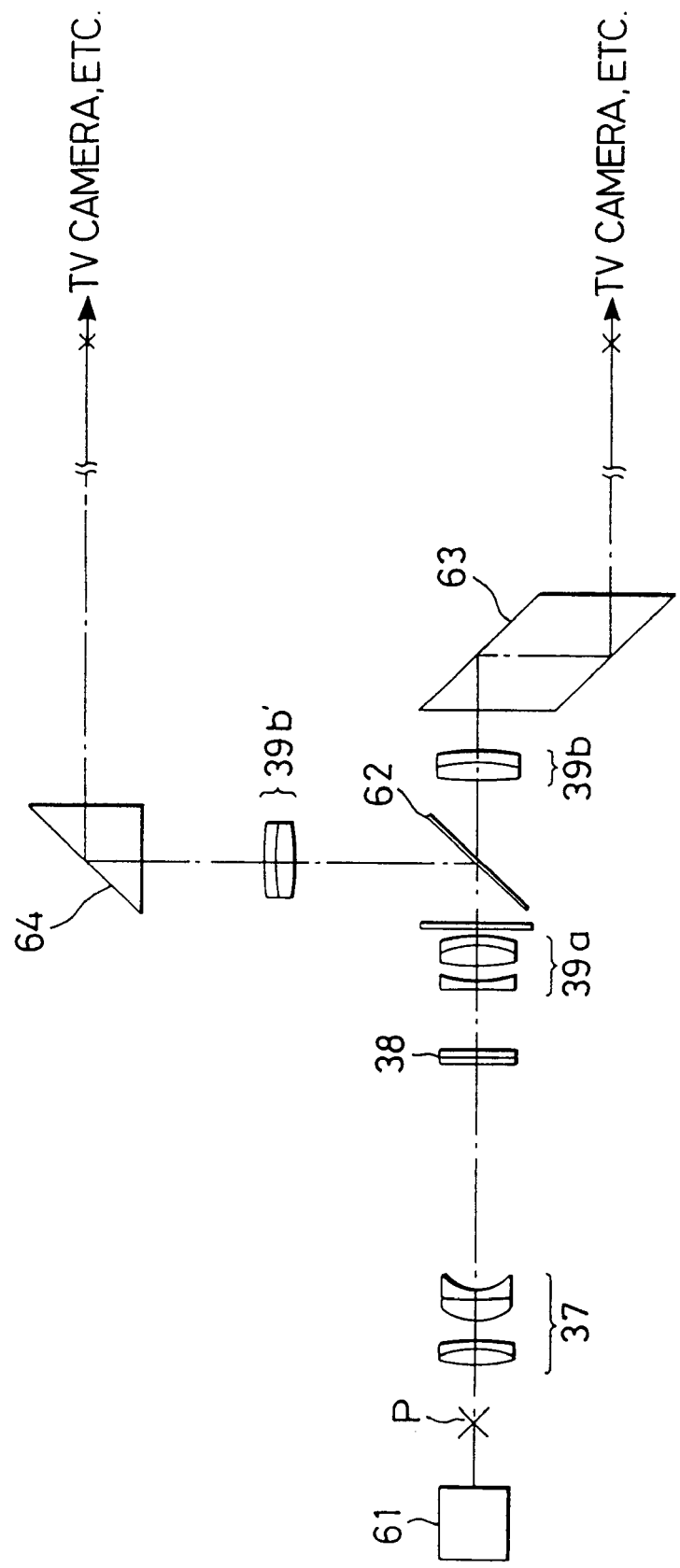
FIG. 13 is a view showing the arrangement of an optical system in a fourth embodiment of the microscope apparatus according to the present invention.

FIG. 13 shows the optical arrangement, along the optical axis, of the microscope apparatus according to the fourth embodiment. This embodiment is directed to a relay optical system used in a two-image photographing optical system to connect two TV cameras or photographic devices with a microscope body, irrespective of an uplight or inverted microscope. As shown in the figure, an image transmitted from a microscope body 61, after being formed at a position P, is relayed by the image relay lens 37 and is incident through the pupil modulator 38 on the first lens unit 39a of the image relay lens 39 for an infinite relay. The image is then transmitted through, and reflected by, a half mirror 62 interposed between the first lens unit 39a and the second lens units 39b and 39b' of the image relay lens 39. The transmitted and reflected images enter the second lens units 39b and 39b', respectively. Subsequently, the images are brought into convergent beams by the powers of the second lens units 39b and 39b', and after passing through reflecting prisms 63 and 64, are introduced into TV cameras or photographic devices, not shown.

If the half mirror 62 is replaced with a dichroic mirror, it becomes possible that only a ray of a particular wavelength is chosen and introduced onto an image plane. Moreover, the microscope apparatus of the fourth embodiment is designed so that it can be mounted to the binocular photographing optical path section of an uplight or inverted microscope, or the side ports of an inverted microscope such as the optical paths 17a and 17c shown in FIG. 2. In the present invention, it is also possible to use a relay optical system from which the pupil modulator is removed.

Fifth Embodiment

Figure 17:
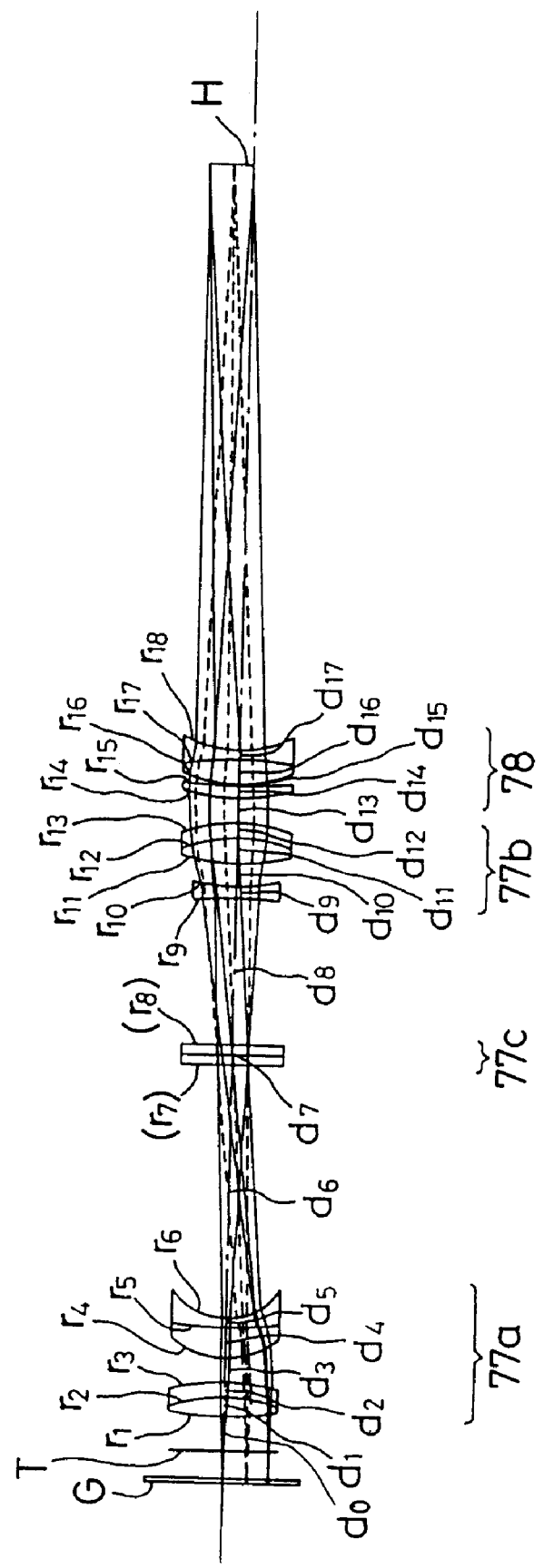
FIG. 17 is a view showing the arrangement, along the optical axis, of an image relay optical system used in the optical system of FIG. 16.

FIGS. 14 to 17 show the fifth embodiment of the microscope apparatus according to the present invention. In these figures, reference numeral 71 denotes a light source device including a source of light and a relay optical system for relaying illumination light from the source of light; 72 a condenser lens; 73 a stage; 74 an objective lens supported by a revolver for relaying the image of a specimen to infinity; 75 an imaging lens for forming the image of the specimen having been relayed to infinity; 76 a mirror; 77 a front lens unit of an image relay optical system including a pupil relay lens 77a and an image relay lens 77b; 78 a rear lens unit of the image relay optical system; 79 a unit which includes the rear lens unit 78 constructed integral with a binocular prism system 79a and is mounted at a mounting portion 79b; and 80 an eyepiece. In this case, the arrangement is such that the focal length of the imaging lens 75 is equal to that of the rear lens unit 78 of the image relay optical system.

in FIG. 17, reference numeral 77c designates a pupil modulator which is removably disposed between the pupil relay lens 77a and the image relay lens 77b, symbol G designates the position of the primary image formed by the imaging lens 75, and H designates the position of the real image formed in front of the eyepiece 80.

The following are the numerical data of lenses of the image relay optical system shown in FIG. 17.

Magnification = 1, Numerical aperture = 0.04,
Image height = 11,
Focal length of the pupil relay lens 77a = 87.017,
Focal length of the image relay lens 77b = 166.558,
Focal length of the rear lens unit 78 of the image
relay optical system = 180,
Pupil projection magnification β = 0.5626
Thickness d of the reticle T = 1.5

$d_0 = 17.7569$
$r_1 = 80.631$
  $d_1 = 5.2$    $n_1 = 1.60311$   $v_1 = 60.7$
$r_2 = -33.5740$
  $d_2 = 2.7$    $n_2 = 1.80518$   $v_2 = 25.43$
$r_3 = -86.478$
  $d_3 = 7.5$
$r_4 = 20.316$
  $d_4 = 7.11$   $n_4 = 1.744$     $v_4 = 44.73$
$r_5 = 130.487$
  $d_5 = 2.97$   $n_5 = 1.741$     $v_5 = 52.68$
$r_5 = 14.935$
  $(d_6 + d_7 + d_8) = 107.09$
$r_9 = -172.563$
  $d_9 = 3.24$   $n_9 = 1.50847$   $v_9 = 60.83$
$r_{10} = 38.325$
  $d_{10} = 5.72$
$r_{11} = 51.848$
  $d_{11} = 7.51$  $n_{11} = 1.456$    $v_{11} = 90.31$
$r_{12} = -27.45$
  $d_{12} = 3.04$  $n_{12} = 1.50847$  $v_{12} = 60.83$
$r_{13} = -39.564$
  $d_{13} = 35.1631$
$r_{14} = 54.9349$
  $d_{14} = 3$    $n_{14} = 1.48749$  $v_{14} = 70.2$
$r_{15} = 278.88$
  $d_{15} = 0.3359$
$r_{16} = 32.9209$
  $d_{16} = 6$    $n_{16} = 1.72342$  $v_{16} = 37.95$

-continued r$_{17}$ = -90.9349
          d$_{17}$ = 2.6          n$_{17}$ = 1.7185    v$_{17}$ = 33.52
r$_{18}$ = 25.9272

Since the fifth embodiment is constructed as mentioned above, the primary image G of the specimen placed on the stage 73 is formed between the imaging lens 75 and the pupil relay lens 77a, and the pupil image of the objective lens 74 is projected between the pupil relay lens 77a and the image relay lens 77b. The primary image is then relayed through the front and rear lens units 77 and 78 of the image relay optical system, and the real image H as the secondary image is formed, through the unit 79, in front of the eyepiece 80. In this way, the image of the specimen is observed by the eyepiece 80. Since there are a reflecting surface set at an acute angle between the imaging lens 75 and the primary image G, and the binocular prism system 79a which divides the image into two for a binocular observation, the number of reflections is only three, and thus the image which is bright and free of flare and ghost can be observed.

The objective lens 74 is designed to relay the image of the specimen as parallel rays, and the imaging lens 75 is to form this relayed image. This arrangement dispenses with the need for a negative lens which has been required for the revolver in the past. Consequently, the number of lenses is decreased, and thus stray light, such as detrimental ghost and flare, becomes difficult to occur. Moreover, in the absence of the negative lens, aberration is not caused, and good image performance can be obtained.

Since the image relay optical system relaying the primary image to the secondary image is composed of the front and rear lens units 77 and 78 so as to relay the image to infinity between them, image performance will not be degraded even though the distance between the front and rear lens units 77 and 78 is changed. As such, by changing this distance, the position of the eyepoint can easily be adjusted.

Furthermore, since the arrangement is such that the focal length of the imaging lens 75 is equal to that of the rear lens unit 78 of the image relay optical system, an infinite objective lens for up-light microscopes can be utilized without using a particular magnification correction optical system, and a systematism as a microscope can be improved. The condition that the focal length of the imaging lens 75 is made equal to that of the rear lens unit 78 of the image relay optical system is applicable to an inverted microscope using an optical system with five reflections.

In inverted microscopes, to secure the optimum position of the eyepoint, it is required that the height from the table surface to the eyepoint is about 300–500 mm, and the entire length of the image relay optical system must satisfy this value. In this case, when the focal length of the imaging lens is represented by $f_1$, the focal length of the front lens unit of the image relay optical system by $f_2$, and the focal length of the rear lens unit by $f_3$, it is desirable to satisfy the condition of $0.5 \times f_3 < f_2 < 2 \times f_3$. Where the arrangement satisfies the condition of $f_1 = f_3$ as mentioned above, it is preferable that the arrangement further satisfies the condition of $f_2 = f_3$. By doing so, the rear lens unit is easily corrected for aberration, and the optimum position of the eyepoint can be ensured.

The front lens unit 77 of the image relay optical system can bring about an optimum pupil projection magnification and image projection magnification by means of the pupil relay lens 77a for controlling the relay magnification of the pupil of the objective lens 74 and the image relay lens 77b for controlling the relay magnification of the image. In this case, the pupil relay lens 77a is constructed with at least one positive lens element, thereby enabling the pupil projection magnification to be optimized. In order to correct for chromatic aberration for the pupil, it is favorable that the pupil relay lens 77a has at least one cemented lens element. In order to further correct for curvature of field without increasing spherical aberration for the image, it is convenient to use a meniscus lens. The image relay lens 77b is constructed with at least one positive lens element, and thereby the projection magnification of the entire relay system can be optimized. To minimize curvature of field for the image relay lens, it is effective that a negative lens is combined with a positive lens to correct the Petzval sum.

Figure 14:
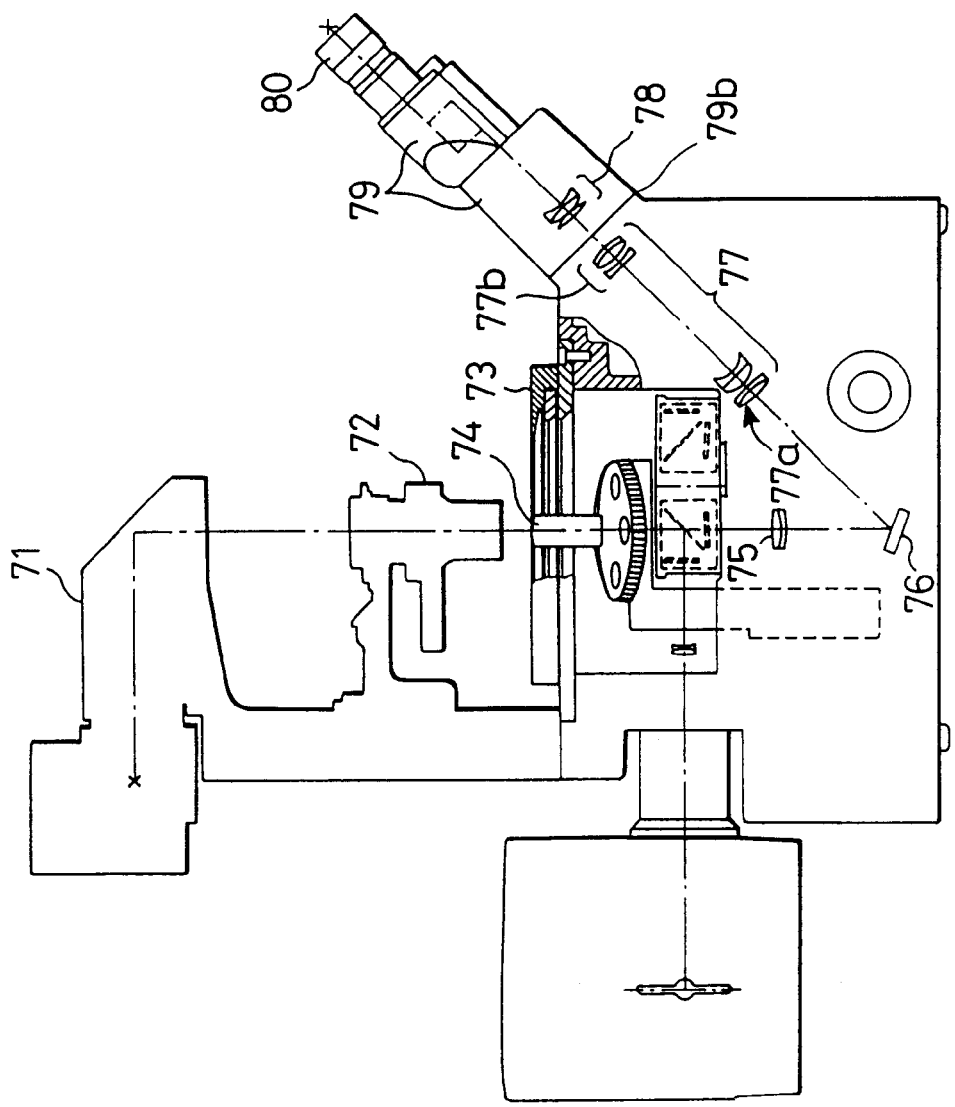
FIG. 14 is a schematic side view showing the entire construction in a fifth embodiment of the microscope apparatus according to the present invention.
Figure 15:
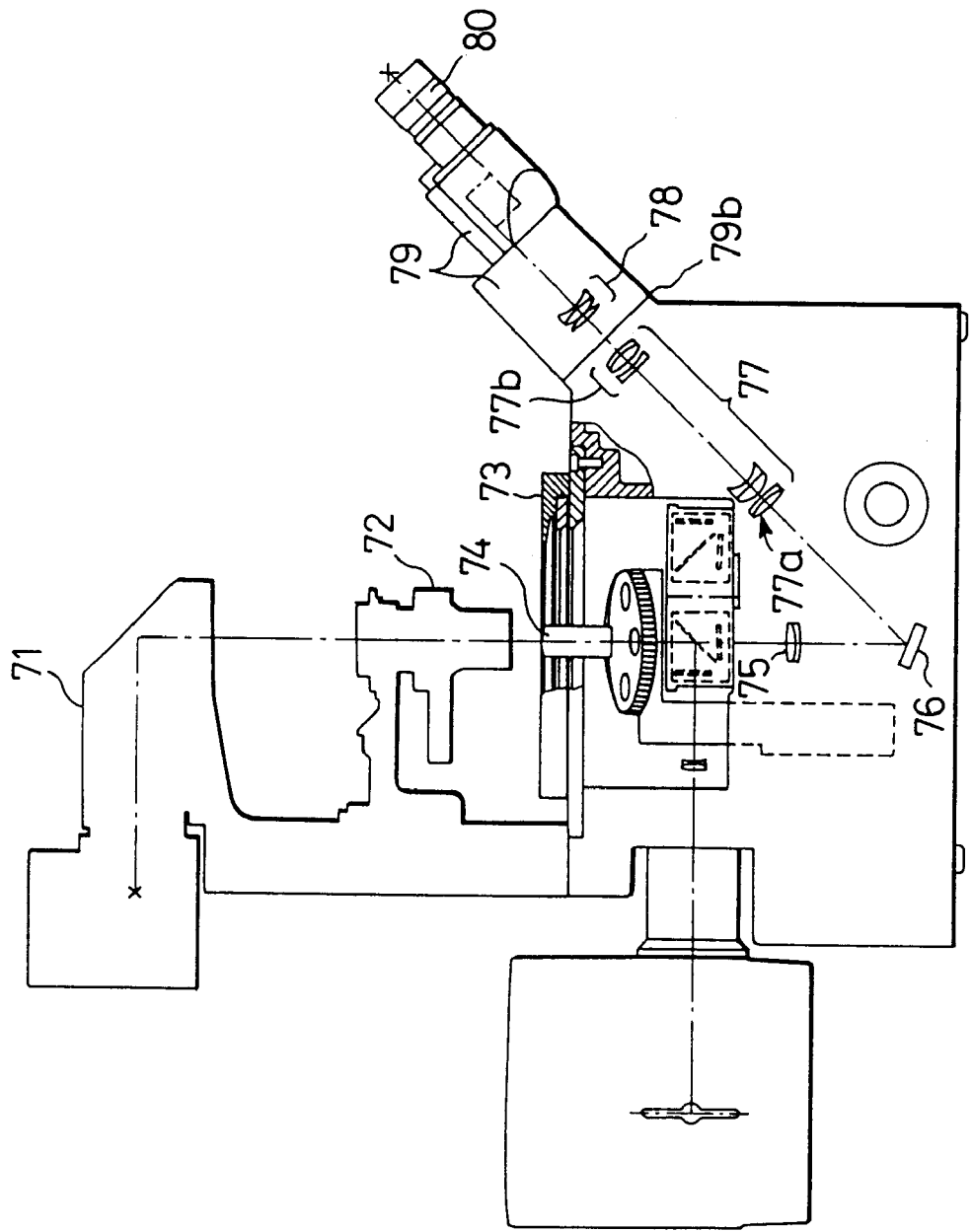
FIG. 15 is a schematic side view showing the microscope apparatus in which the position of an eyepoint is different from that of FIG. 14.
Figure 16:
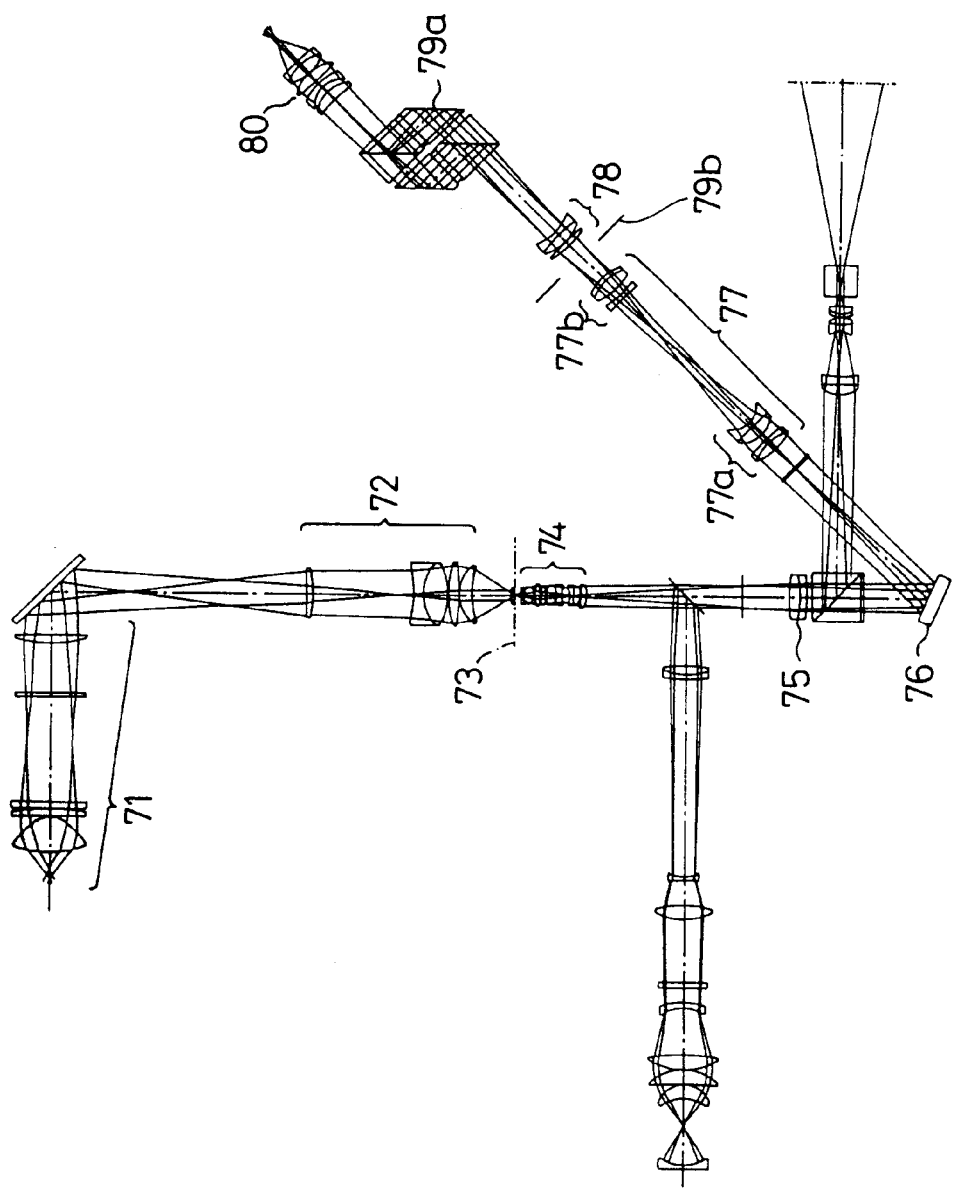
FIG. 16 a view showing the arrangement of the entire optical system of the microscope apparatus of FIG. 14.

The position of the eyepoint can be changed, for example, from the position of FIG. 14 to that of FIG. 15, if the arrangement is such that the front lens unit 77 of the image relay optical system can be separated through a mounting portion 79b from the rear lens unit 78 and the unit 79 including the rear lens unit 78 is mounted to be rotatable with respect to the microscope body.

Sixth Embodiment

FIG. 18 shows the sixth embodiment of the microscope apparatus according to the present invention. In this figure, only parts different from the fifth embodiment are shown. Specifically, the sixth embodiment is the same as the fifth embodiment with the exception that a pupil observation lens 81 is interposed between the rear lens unit 78 and the binocular prism system 79a to be removable, for example, through a known turret mechanism 82.

The following are the numerical data of the pupil observation lens 81 in the sixth embodiment (see FIG. 19).

r$_1$ = 10.98
          d$_1$ = 6.09    n$_1$ = 1.4645    v$_1$ = 66
r$_2$ = -21.86
          d$_2$ = 2.15
r$_3$ = -14.7
          d$_3$ = 3.52    n$_3$ = 1.7725    v$_3$ = 49.6
r$_4$ = 9.78
          d$_4$ = X
r$_5$ = 14.28
          d$_5$ = 5.55    n$_5$ = 1.60311   v$_5$ = 57
r$_6$ = -8.24
          d$_6$ = 1       n$_6$ = 1.72      v$_6$ = 50.2
r$_7$ = -49.39
          d$_7$ = Y
Y = 34.79 − X (Space change by focus adjustment)

According to the sixth embodiment, the pupil observation lens 81 is interposed between the rear lens unit 78 of the image relay optical system and the binocular prism system 79a, and hence, even with the inverted microscope with three reflections, a space for providing optical paths for manipulators and laser microscopes can be largely taken. Moreover, since the pupil observation lens 81 is situated adjacent to the eyepoint, an operator can operate the turret 82 without extending his hand, and the operability of the pupil observation lens itself is improved.

Seventh Embodiment

FIG. 20 shows the seventh embodiment of the microscope apparatus according to the present invention. In this figure, only parts different from the fifth embodiment are shown. Specifically, the seventh embodiment is the same as the fifth embodiment with the exception that the pupil observation lens 81 is disposed in an infinite optical path between the front and rear lens units 77 and 78 of the image relay optical system to be removable, for example, through a known slider 83.

The following is the numerical data of the pupil observation lens 81 in the seventh embodiment (see FIG. 21).

| | | | |
|---|---|---|---|
| $r_1 = -19.050$ | | | |
| | $d_1 = 1.1$ | $n_1 = 1.54072$ | $v_1 = 47.2$ |
| $r_2 = 33.3184$ | | | |
| | $d_2 = 0.898$ | | |
| $r_3 = 53.3160$ | | | |
| | $d_3 = 2$ | $n_3 = 1.60311$ | $v_3 = 60.7$ |
| $r_4 = -17.3709$ | | | |

According to the seventh embodiment, the pupil observation lens 81 is disposed between the front and rear lens units 77 and 78 of the image relay optical system, namely in the location where the image is relayed to infinity, and thus has the same function and effect as in the sixth embodiment. In this case, the pupil observation lens can be constructed with at least one positive lens element and at least one negative lens element, and the adjustment of the space between both these lens elements makes it possible to observe the pupils of the objective lens at various pupil positions.

Eighth Embodiment

Figure 22:
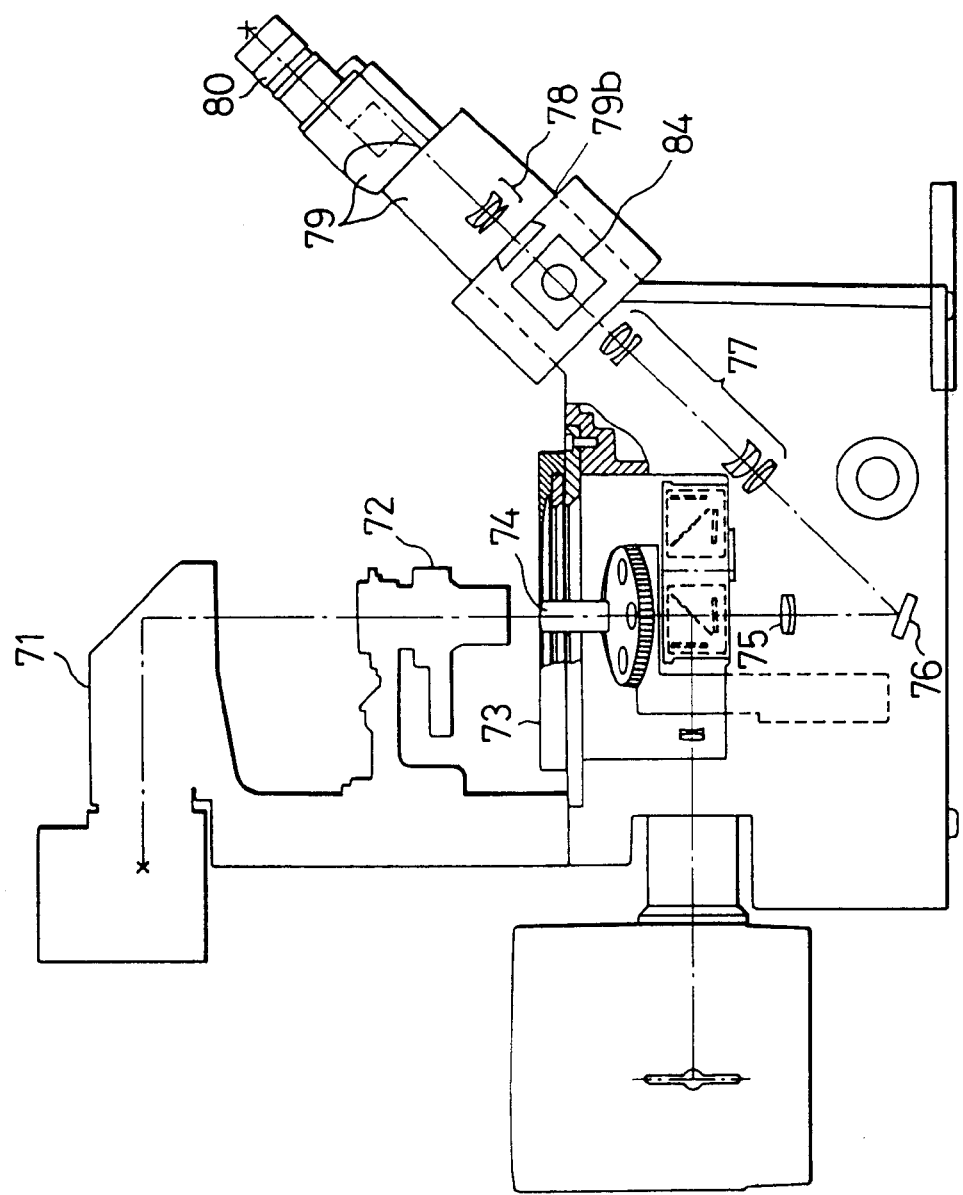
FIG. 22 is a schematic side view showing the entire construction in an eighth embodiment of the microscope apparatus according to the present invention.
Figure 23:
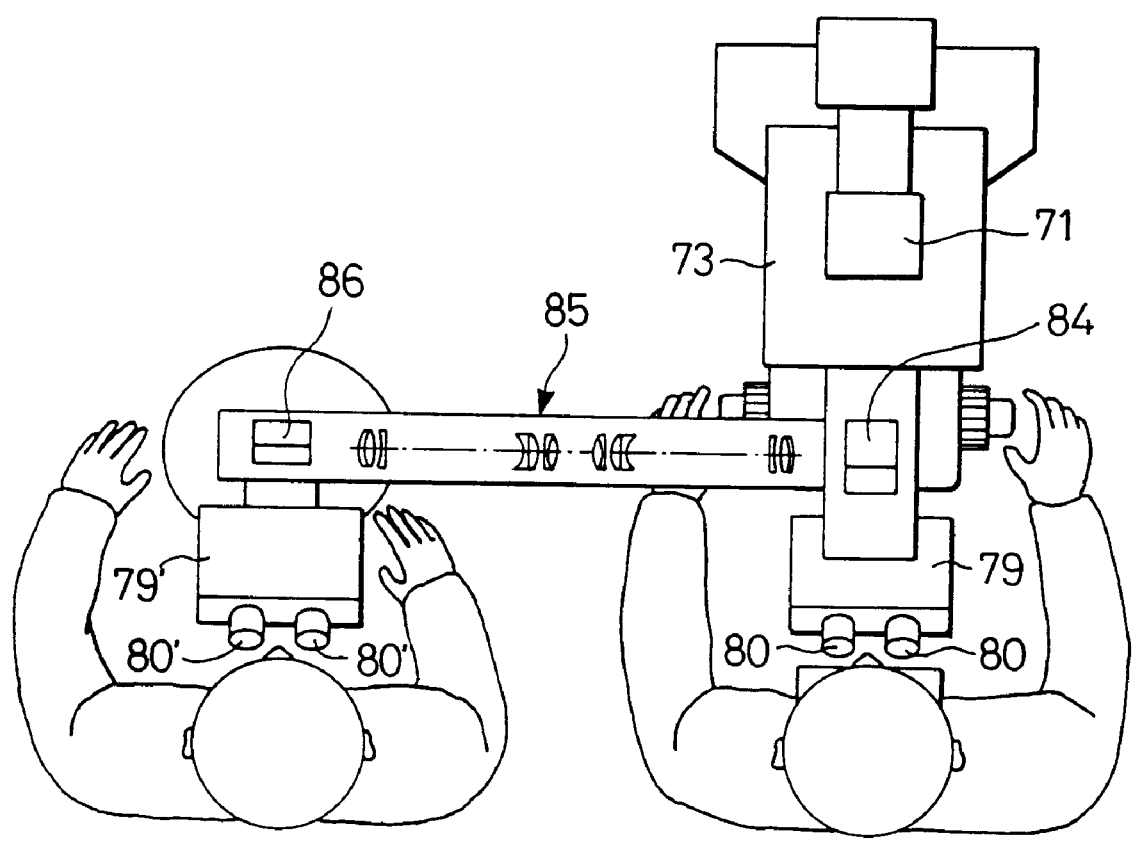
FIG. 23 is a plan view of FIG. 22.

FIGS. 22 and 23 show the eighth embodiment of the microscope apparatus according to the present invention. In this embodiment, a prism 84 of nearly 30 mm cube is inserted in the optical path where the image is relayed to infinity between the front and rear lens units 77 and 78 of the image relay optical system, and splits the image into two so that a chief observer and a sub-observer can view the image at the same time. Specifically, one of the rays split by the prism 84 forms the secondary image through a relay system 85 on the way to the sub-observer and is relayed as an infinite image. The infinite image entering a prism 86 situated below a binocular prism system for the sub-observer is directed toward the sub-observer and is formed by an imaging lens constructed integral with a binocular prism system housed in a unit 79'. In this way, the image is observed through eyepieces 80'.

According to the eighth embodiment, more than one person can observe a microscope image, and thus the technique of cell treatment, for example, by manipulators, can be explained to researchers and students. Furthermore, since the optical path can be split adjacent to the position of the eyepoint, the microscope of this type which is easy to use can be provided so as not to obstruct experimental instruments, such as manipulators, set around the specimen.

In each embodiment mentioned above, the rear lens unit 78 of the image relay optical system can be constructed integral with the binocular prism system 79a so that this optical system can be removed with respect to the mounting portion 79b between the front and rear lens units 77 and 78 of the image relay optical system. In this case, binoculars and optical systems can be variously combined which have a wide variety of applications, not only to binoculars for visual observation, but also to optical systems for TV camera observation and variable magnification optical systems. Thus, an increase in the number of degrees of observation freedom which researchers demand can be obtained. The rear lens unit 78 of the image relay optical system is constructed with a positive lens, but, in particular, to make aberration for the image remain unchanged even when the space between the front and rear lens units 77 and 78 is changed, the production of aberration must be kept to a minimum even when the pupil position is shifted. For this purpose, it is required that spherical aberration is corrected by two or more positive lenses.

A Siedentopf type lens barrel is designed so that the lens barrel can be rotated by 180° in regard to the mounting position of binoculars, that is, the mounting portion 79b between the front and rear lens units 77 and 78 of the image relay optical system, and thereby the position of the eyepoint of the Siedentopf type lens barrel can be moved vertically (refer to FIGS. 14 and 15). Consequently, the observer can choose the position of the eyepoint where observation is easily made, and hence can make observation in a comfortable position.

In the numerical data of each embodiment, $r_1, r_2, \ldots$ represent radii of curvature of individual lens surfaces; $d_1, d_2, \ldots$ thicknesses of individual lenses or spaces therebetween; $n_1, n_2, \ldots$ refractive indices of individual lenses; and $v_1, v_2, \ldots$ Abbe's numbers of individual lenses.

What is claimed is:

1. A microscope apparatus comprising:

an objective lens adapted to relay an image of a specimen to infinity by collimating a beam of light from the specimen;

an imaging lens adapted to form a primary image of the specimen from the beam of light emergent from said objective lens; and an image relay optical system adapted to relay said primary image to form a secondary image adjacent to an eyepiece and to project a pupil image of said objective lens, wherein said image relay optical system is configured such that a front side portion thereof is adapted to re-collimate the beam of light to cause a rear side portion thereof to receive a parallel beam of light, and wherein said image relay optical system includes a pupil relay lens adapted to project a pupil image of said objective lens and an image relay lens comprising a front lens unit and a rear lens unit, the front side portion of said image relay optical system containing said pupil relay lens and said front lens unit of said image relay lens, and the rear side portion of said image relay optical system containing said rear lens unit of said image relay lens.

2. A microscope apparatus comprising:

an objective lens adapted to relay an image of a specimen to infinity by collimating a beam of light from the specimen;

an imaging lens adapted to form a primary image of the specimen from the beam of light emergent from said objective lens; and an image relay optical system adapted to relay said primary image to form a secondary image adjacent to an eyepiece, said image relay optical system including:

a reflecting plane set at an acute angle between said imaging lens and said primary image; and a lens system including a pupil relay lens adapted to project a pupil image of said objective lens and an image relay lens, said lens system being constructed to form a parallel beam of light, as re-collimated, inside a space between said primary image and said secondary image to allow an eyepoint to be moved along an optical axis, wherein a secondary-image-side portion of said image relay lens, which portion receives the parallel beam of light and is defined as a rear lens unit, is removably arranged.

3. A microscope apparatus comprising:

an objective lens adapted to relay an image of a specimen to infinity by collimating a beam of light from the specimen;

an imaging lens adapted to form a primary image of the specimen from the beam of light emergent from said objective lens;

an image relay optical system adapted to relay said primary image to form a secondary image adjacent to an eyepiece and to project a pupil image of said objective lens; and a pupil modulator having a member adapted to change one of a transmittance and phase of light, wherein said image relay optical system is configured such that a front side portion thereof is adapted to re-collimate the beam of light to cause a rear side portion thereof to receive a parallel beam of light, and wherein said pupil modulator is located at a projected position of the pupil image.

4. A microscope apparatus according to claim 1 or 2, further comprising a beam splitter inserted in the parallel beam of light formed inside a space between the primary image and the second image of the specimen, so that a plurality of binocular units are allowed to be used with said microscope apparatus.

5. A microscope apparatus according to claim 1, further comprising a pupil modulator having a member adapted to change one of a transmittance and a phase of light, said pupil modulator being located at a projected position of the pupil image.

6. A microscope apparatus according to claim 5 or 3, wherein at least one reflecting plane is interposed between said objective lens and said pupil modulator.

7. A microscope apparatus according to claim 5 or 3, wherein said pupil modulator is constructed to be finely adjustable with respect to a location thereof along an optical axis and in a direction perpendicular to the optical axis.

8. A microscope apparatus according to claim 1, wherein said image relay optical system satisfies a condition:

$$F/3.5 \leq F_P \leq F1.1$$

where $F_P$ is a focal length of said pupil relay lens, and F is a focal length of said rear lens unit of said image relay lens.

9. A microscope apparatus according to claim 1, wherein said microscope apparatus satisfies a condition:

$$d \geq 50 \text{ mm}$$

where d is a distance between a mounting surface of said objective lens and a first surface of said imaging lens.

10. A microscope apparatus according claim 1, wherein said imaging lens for forming said primary image satisfies a condition:

$$150 \leq F' \leq 200 \text{ mm}$$

where F' is a focal length of said imaging lens.

11. A microscope apparatus according to claim 1 or 2, further comprising:

a lens for pupil observation; and a binocular prism system, said lens for pupil observation being removably disposed between said imaging lens and said binocular prism system.

12. A microscope apparatus according to claim 1, wherein a binocular mounting portion situated between said front lens unit and said rear lens unit of said image relay lens is constructed to be rotatable by 180° to thereby change a height of an eyepoint.

13. A microscope apparatus according to claim 1, further comprising a prism constructed with three prism elements cemented to one another for splitting light emerging from said imaging lens into two.

14. A microscope apparatus according to claim 2, wherein said image relay lens is constructed with two lens units which are a front lens unit and said rear lens unit.

15. A microscope apparatus according to claim 2, wherein a pupil modulator used for phase contrast observation, modulation contrast, and Schlieren methods, is located at a projected position of the pupil image.

16. A microscope apparatus comprising:

an objective lens adapted to relay an image of a specimen to infinity by collimating a beam of light from the specimen;

an imaging lens adapted to form a primary image of the specimen from the beam of light emergent from said objective lens; and an image relay optical system adapted to relay said primary image to form a secondary image adjacent to an eyepiece and to project a pupil image of said objective lens, wherein said image relay optical system is configured such that a front side portion thereof is adapted to re-collimate the beam of light to cause a rear side portion thereof to receive a parallel beam of light, and wherein said image relay optical system comprises a pupil relay lens adapted to project the pupil image of said objective lens and an image relay lens, said image relay lens comprises a front lens unit and a rear lens unit, and a binocular mounting portion situated between said front lens unit and said rear lens unit of said image relay lens is constructed to be rotatable by 180° to thereby change a height of an eyepoint.

17. A microscope apparatus comprising:

an objective lens for projecting an image of a specimen at infinity as a parallel beam of light;

an imaging lens for forming a primary image from the parallel beam of light emergent from said objective lens;

an image relay optical system for relaying the primary image formed by said imaging lens, said image relay optical system including:

a pupil relay lens for projecting a pupil image of said objective lens, said pupil relay lens having at least one positive lens element, a surface, closest to the specimen, of said pupil relay lens being configured to be convex toward the specimen, and an image relay lens having at least one positive lens element, at least one surface of lenses constituting said image relay lens being configured to be convex toward the specimen, and a pupil modulator having a member for changing one of a transmittance and a phase of light, said pupil modulator being located at a projected position of the pupil image of said objective lens, wherein said objective lens is selectively used among a plurality of objective lenses having different positions of pupils, and said microscope apparatus satisfies a condition:

$$6.3 \leq A$$

where A is a space range in which said pupil modulator is allowed to be disposed, said space range being obtained as a product of a variation range of the positions of the pupils of said plurality of objective lenses and a square of a pupil projection magnification.

18. A microscope apparatus comprising:

an objective lens for projecting an image of a specimen at infinity as a parallel beam of light;

an imaging lens for forming a primary image from the parallel beam of light emergent from said objective lens;

an image relay optical system for relaying the primary image formed by said image lens, said image relay optical system including:

a pupil relay lens for projecting a pupil image of said objective lens, said pupil relay lens having at least one objective lens element, a surface, closest to the specimen, of said pupil relay lens being configured to be convex toward the specimen, and an image relay lens having at least one positive lens element, at least one surface of lenses constituting said image relay lens being configured to be convex toward the specimen, a lens for pupil observation; and a binocular prism system, wherein said lens for pupil observation is removably disposed between said imaging lens and said binocular prism system.

19. A microscope apparatus comprising:

an objective lens for projecting an image of a specimen at infinity as a parallel beam of light;

an imaging lens for forming a primary image from the parallel beam of light emergent from said objective lens; and an image relay optical system for relaying the primary image formed by said imaging lens, said image relay optical system including:

a pupil relay lens for projecting a pupil image of said objective lens, said pupil relay lens having at least one positive lens element, a surface, closest to the specimen, of said pupil relay lens being configured to be convex toward the specimen, and an image relay lens composed of two lens units which are a front lens unit and a rear lens unit, said image relay lens having at least one positive lens element, at least one surface of lenses constituting said image relay lens being configured to be convex toward the specimen, wherein a binocular mounting portion situated between said front lens unit and said rear lens unit of said image relay lens is constructed to be rotatable by 180° to thereby change a height of an eyepoint.

20. A microscope apparatus comprising:

an objective lens adapted to relay an image of a specimen to infinity by collimating a beam of light from the specimen;

an imaging lens adapted to form a primary image of the specimen from the beam of light emergent from said objective lens; and an image relay optical system adapted to relay said primary image to form a secondary image adjacent to eyepiece and to project a pupil image of said objective lens, wherein said image relay optical system is configured such that a front side portion thereof is adapted to re-collimate the beam of light to cause a rear side portion thereof to receive a parallel beam of light, and wherein said imaging lens for forming said primary image satisfies a condition:

$$150 \leq F' \leq 200 \text{ mm}$$

where F' is a focal length of said imaging lens.

21. A microscope apparatus comprising:

an objective lens adapted to relay an image of a specimen to infinity by collimating a beam of light from the specimen;

an imaging lens adapted to form a primary image of the specimen from the beam of light emergent from said objective lens;

an image relay optical system adapted to relay said primary image to form a secondary image adjacent to an eyepiece and to project a pupil image of aid objective lens;

a lens for pupil observation; and a binocular prism system, wherein said image relay optical system is configured such that a front side portion thereof is adapted to re-collimate the beam of light to cause a rear side portion thereof to receive a parallel beam of light, and wherein said lens for pupil observation is removably disposed between said imaging lens and said binocular prism system.

* * * * *